United States Patent [19]
Madduri et al.

[11] Patent Number: 6,154,856
[45] Date of Patent: Nov. 28, 2000

[54] DEBUG INTERFACE INCLUDING STATE MACHINES FOR TIMING SYNCHRONIZATION AND COMMUNICATION

[75] Inventors: Venkateswara Rao Madduri, Austin, Tex.; Carl Wakeland, Scotts Valley, Calif.; James Torrey, Austin, Tex.

[73] Assignee: Advanced Micro Devices, Inc., Sunnyvale, Calif.

[21] Appl. No.: 09/034,651

[22] Filed: Mar. 4, 1998

Related U.S. Application Data

[60] Provisional application No. 60/043,070, Apr. 8, 1997.

[51] Int. Cl.$^7$ .................................................. G06F 11/00
[52] U.S. Cl. ............................ 714/27; 714/38; 712/227
[58] Field of Search ..................... 395/703, 704, 395/705, 712; 714/38, 27; 717/3, 4, 5, 11; 712/227

[56] References Cited

U.S. PATENT DOCUMENTS

| | | | |
|---|---|---|---|
| 3,707,725 | 12/1972 | Dellheim | 714/38 |
| 4,429,368 | 1/1984 | Kurii | 364/580 |
| 4,462,077 | 7/1984 | York | 364/300 |

(List continued on next page.)

FOREIGN PATENT DOCUMENTS

| | | |
|---|---|---|
| 0 316 609 A2 | 5/1989 | European Pat. Off. . |
| 0 530 816 A3 | 3/1993 | European Pat. Off. . |
| 0 636 976 A1 | 2/1995 | European Pat. Off. . |
| 0 762 276 A1 | 3/1997 | European Pat. Off. . |
| 0 849 670 A1 | 6/1998 | European Pat. Off. . |
| 59-194245 | 11/1984 | Japan . |

OTHER PUBLICATIONS

OJennes, Dan, "Debugging With Real–Time Trace", Embedded Systems Programming, Aug. 1997, pp. 50–58.
O'Farrell, Ray, "Choosing a Cross–Debugging Methodology", Embedded Systems Programming, Aug. 1997, pp. 84–89.
Ganssle, Jack G., "Vanishing Visibility, Part 2", Embedded Systems Programming, Aug. 1997, pp. 113–115.
Am29040™, "29K Family", Microprocessor User's Manual, Advanced Micro Devices, Inc. 1994, pp. 12–1 through 12–26.
Revill, Geoff, "Advanced On–chip Debug for ColdFire Developers", Embedded Systems Engineering, Apr./May 1997, pp. 52–54.
Larus, James R., "Efficient Program Tracing", 8153 Computer, No. 5, Los Alamitos, CA, May 26, 1993, pp. 1–10.
IBM Technical Disclosure Bulletin, "Tailorable Embedded Event Trace", vol. 34, No. 7B, Dec. 1991, pp. 259–261.

(List continued on next page.)

Primary Examiner—Robert W. Beausoliel, Jr.
Assistant Examiner—Pierre Eddy Elisca
Attorney, Agent, or Firm—Zagorin, O'Brien & Graham, LLP

[57] ABSTRACT

A system for debugging a processor includes logic circuits for communicating commands and data between a serial input/output port, a trace logic, and the processor. Some embodiments of the debugging system also include a parallel input/output port so that the logic circuits also communicate commands and data between the parallel input/output port, the trace logic, and the processor. The debug system includes a plurality of state machines that read the commands and data from the serial input/output ports. The commands are decoded by a decode logic. Some of the commands, such as commands for reading data from memory, utilize processor intervention and are transferred to the processor for execution. The state machines operate only on a single command at one time so that an active state machine does not accept additional commands until completion of the command that is currently executed. Once execution of the command is complete, the state machines generate an indication of the completion event or condition, typically by setting a flag in a debug register or by asserting a readable output pin. The completion event or condition is accessed by a debug tool such as a host processor, a monitoring tool, or the like.

35 Claims, 16 Drawing Sheets

U.S. PATENT DOCUMENTS

| | | | |
|---|---|---|---|
| 4,598,364 | 7/1986 | Gum et al. | 364/300 |
| 5,058,114 | 10/1991 | Kuboki et al. | 371/19 |
| 5,321,828 | 6/1994 | Phillips et al. | 395/500 |
| 5,355,369 | 10/1994 | Greenbergerl et al. | 371/22.3 |
| 5,357,626 | 10/1994 | Johnson et al. | 395/500 |
| 5,371,689 | 12/1994 | Tatsuma | 364/569 |
| 5,394,544 | 2/1995 | Motoyama et al. | 395/575 |
| 5,488,688 | 1/1996 | Gonzales et al. | 395/183.1 |
| 5,491,793 | 2/1996 | Somasundaram et al. | 395/183.21 |
| 5,530,804 | 6/1996 | Edgington et al. | 395/183.06 |
| 5,533,192 | 7/1996 | Hawley et al. | 395/183.04 |
| 5,544,311 | 8/1996 | Harenberg et al. | 395/183.16 |
| 5,584,038 | 12/1996 | Papworth et al. | 395/800 |
| 5,590,354 | 12/1996 | Klapproth et al. | 395/800 |
| 5,615,331 | 3/1997 | Toorians et al. | 395/182.07 |
| 5,630,102 | 5/1997 | Johnson et al. | 395/500 |
| 5,642,479 | 6/1997 | Flynn | 395/183.21 |
| 5,724,505 | 3/1998 | Argade et al. | 714/45 |
| 5,751,942 | 5/1998 | Christensen et al. | 395/183.14 |
| 5,752,013 | 5/1998 | Christensen et al. | 395/568 |
| 5,764,885 | 6/1998 | Sites et al. | 395/183.21 |
| 5,768,152 | 6/1998 | Battaline et al. | 364/551.01 |
| 5,771,240 | 6/1998 | Tobin et al. | 371/22.1 |
| 5,774,684 | 6/1998 | Haines et al. | 395/309 |
| 5,774,708 | 6/1998 | Klingler | 395/568 |
| 5,802,272 | 9/1998 | Sites et al. | 395/183.21 |
| 5,812,562 | 9/1998 | Baeg | 371/22.31 |
| 5,828,824 | 10/1998 | Swoboda | 395/183.01 |
| 5,828,825 | 10/1998 | Eskandari et al. | 395/183.03 |
| 5,848,264 | 12/1998 | Baird et al. | 395/500 |
| 5,867,644 | 2/1999 | Ranson et al. | 395/183.15 |
| 5,901,283 | 5/1999 | Kanzaki | 395/183.14 |
| 5,978,902 | 11/1999 | Mann | 712/227 |
| 5,978,937 | 11/1999 | Miyamori et al. | 714/45 |
| 5,996,092 | 11/1999 | Augsburg et al. | 714/38 |
| 6,041,406 | 3/2000 | Mann | 712/227 |

OTHER PUBLICATIONS

Motorola, "Personal Computer– BDM Connection", MEVB Quick Start Guide, pp. 3–5 and 7–2 (admitted prior to Apr. 8, 1997).

Motorola, "CPU32 Reference Manual", Section 7 Development Support, pp. 7–1 through 1–13 (admitted prior to Apr. 8, 1997).

U.S. Patent application Ser. No. 08/949,897, filed Oct. 14, 1997, entitled "Trace Cache for Microprocessor Based Device" by Daniel Mann (copies not provided).

U.S. Patent application Ser. No. 08/923,597, filed Aug. 25, 1997, entitled "Software Debug Port for a Microprocessor" by Daniel Mann and Carl Wakeland (copies not provided).

IBM Technical Disclosure Bulletin, "Trace Array", vol. 35, No. 2, pp. Jul. 1992, 138–140.

K5 HDT, Jan. 11, 1997, pp. 1–6.

IEEE Transactions on Nuclear Science, "A Real Time Integrated Environment for Motorola 680xx–based VME and FASTBUS Modules", vol. 36, No. 5, Oct. 1989, pp. 1701–1705.

Standard JTAG interface access state diagram

Enhanced JTAG interface access state diagram

Parallel Debug Port Interface State Diagram

DEBUG INTERFACE INCLUDING STATE MACHINES FOR TIMING SYNCHRONIZATION AND COMMUNICATION

RELATED APPLICATIONS

This application relates to U.S. application Ser. No. 60/043,070, filed Apr. 8, 1997, which is hereby incorporated by reference.

BACKGROUND OF THE INVENTION

1. Field of the Invention

The present invention relates to computer systems such as microprocessors. More specifically, the present invention relates to a software debug support system and operating method in processors.

2. Description of the Related Art

The growth in software complexity, in combination with increasing processor clock speeds, has placed an increasing burden on application software developers. The cost of developing and debugging new software products is now a significant factor in processor selection. A failure to include adequate software debug functionality in a processor results in longer customer development times and reduces attractiveness of the processor for use within industry. Software debug support is particularly useful in the embedded products industry, where specialized on-chip circuitry is often combined with a processor core.

The software debug tool configuration of a processor addresses the needs of several parties in addition to the software engineer who develops program code for execution on the processor. A "trace" algorithm developer searches through captured software trace data that reflects instruction execution flow in a processor. An in-circuit emulator developer deals with problems of signal synchronization, clock frequency and trace bandwidth. A processor manufacturer seeks a software debug tool solution that avoids an increased processor cost or design and development complexity.

In the desktop systems, complex multitasking operating systems are currently available to support software debugging. However, the initial task of getting the operating systems running reliably often calls for special development equipment. While not standard in the desktop environment, development equipment such as logic analyzers, read-only memory (ROM) emulators, and in-circuit emulators (ICE) are sometimes used in the embedded industry. In-circuit emulators have some advantages over other debug environments including complete control and visibility over memory and register contents, and supplying overlay and trace memory if system memory is insufficient.

Traditional in-circuit emulators are used by interfacing a custom emulator back-end with a processor socket to allow communication between emulation equipment and the target system. The custom design of emulator interfaces in increasingly unrealistic and expensive as product life cycles are reduced and nonstandard and exotic integrated circuit packages are predominant in present day processor design.

Few known processor manufacturing techniques are available that include a suitable full-function in-circuit emulation functionality. Most processors in personal computer (PC) systems implement emulation functionality using a multiplexed approach in which existing pins are multiplexed for alternative use in a software debug application. Multiplexing of pins is not desirable in embedded controllers, which inherently suffer from overload of pin functionality.

Some advanced processors multiplex debug pins in time, for example by using the address bus to report software trace information during a Branch Target Address (BTA) cycle. The BTA-cycle is stolen from regular bus operation cycles. However in debug environments with high branch activity and low cache hit rates, BTA-cycles are often fully occupied handling branches, resulting in a conflict over access to the address bus that necessitates processor "throttle back" to prevent a loss of instruction trace information. For example, software in the communications industry is branch-intensive and suffers poor cache utilization often resulting in 20% or more throttle back, an unacceptable amount for embedded products which are subject to real-time constraints.

In another approach, a second "trace" or "slave" processor is combined with a main processor, with the two processors operating in-step. Only the main processor fetches instructions. The second, slave processor monitors fetched instructions on the data bus and maintains an internal state in synchronization with the main processor. The address bus of the slave processor supplies trace information. After power-up, via a JTAG (Joint Test Action Group) input, the second processor is switched into a slave mode of operation. The slave processor, freed from instruction fetch duties, uses the slave processor address bus and other pins to supply trace information.

Another existing debug strategy utilizes implementation of debug support into every processor in a system, but only bonding-out signal pins in a limited number of packages. The bond-out versions of the processor are used during debug and replaced with the smaller package for final production. The bond-out approach suffers from the need to support additional bond pad sites in all fabricated devices, a burden in small packages and pad limited designs, particularly if a substantial number of extra pins are required by the debug support variant. Furthermore, the debug capability of specially-packaged processors is unavailable in typical processor-based production systems.

In yet another approach, specifically the Background Debug, Mode (BDM) implemented by Motorola, Inc., limited on-chip debug circuitry is implemented for basic run control. The BDM approach utilizes a dedicated serial link having additional pins and allows a debugger to start and stop the target system and apply basic code breakpoints by inserting special instructions in system memory. Once halted, special commands are used to inspect memory variables and register contents. The BDM system includes trace support, but not conveniently using the serial link. Instead the BDM system supplies trace support through additional dedicated pins and expensive external trace capture hardware that transfer instruction trace data.

Accordingly, present day techniques for software debugging suffer from a variety of limitations including increased packaging and development costs, circuit complexity, processor throttling, and bandwidth matching difficulties. Furthermore, no adequate low-cost procedure for providing trace information is currently available. The limitations of the existing solutions are likely to be exacerbated in the future as internal processor clock frequencies continue to increase.

What is needed is a software debug system and operating procedure that includes an improved trace capability.

SUMMARY OF THE INVENTION

A system for debugging a processor includes logic circuits for communicating commands and data between a serial input/output port, a trace logic, and the processor. Some embodiments of the debugging system also include a parallel input/output port so that the logic circuits also communicate commands and data between the parallel input/output port, the trace logic, and the processor.

The debug system includes a plurality of state machines that read the commands and data from the serial input/output ports. The commands are decoded by a decode logic. Some of the commands, such as commands for reading data from memory, utilize processor intervention and are transferred to the processor for execution. The state machines operate only on a single command at one time so that an active state machine does not accept additional commands until completion of the command that is currently executed. Once execution of the command is complete, the state machines generate an indication of the completion event or condition, typically by setting a flag in a debug register or by asserting a readable output pin. The completion event or condition is accessed by a debug tool such as a host processor, a monitoring tool, or the like.

In accordance with an embodiment of the present invention, a debug interface for interfacing a processor core to a debug device includes debug registers, a processor interface state machine connected to the debug registers and connectable to the processor core, and a debug port state machine connected to the debug registers and the processor interface state machine, and connectable to the debug device. The processor interface state machine includes an access debug register state responsive to a command from the processor core to request access to the debug register. The debug port state machine includes a write debug register state responsive to the request to access the debug register by writing the debug register.

In accordance with an embodiment of the present invention, a debug interface for interfacing a processor to a debug device includes a serial input/output port, a trace logic connected to the serial input/output port, and an interface logic connected to the serial input/output port and connected to the trace logic. The interface logic includes a state machine for communicating commands and data among the serial input/output port, the trace logic, and the processor. The state machine starts and stops a trace mode of operation upon receipt of commands from the external device so that the trace mode of operation is controlled in addition to setting a break point or executing processor instructions by asserting an external pin that starts and stops the trace mode.

In accordance with some embodiments of the present invention, a debug system for a processor has a first state machine associated with the processor and a second state machine associated with an external debug device. The two state machines generate handshake signals for communicating between the processor and the debug device. The second state machine includes a state for accepting written commands from the external debug device, one or more states for passing commands to a decode unit, and a state that waits until a command communication is complete. The state machines advantageously start and stop a trace operation simply through the issue of commands from the external debug device, avoiding the usage of break points or execution of processor instructions to generate a trace record. The avoidance of break points improves debug performance and reduces test time in the trace mode. The improvement in debug performance is further advantageous since the trace operation is invoked and performed with little intrusion into processor execution. The time for executing a program code is not increased while in the trace mode so that true real-time trace analysis is possible.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
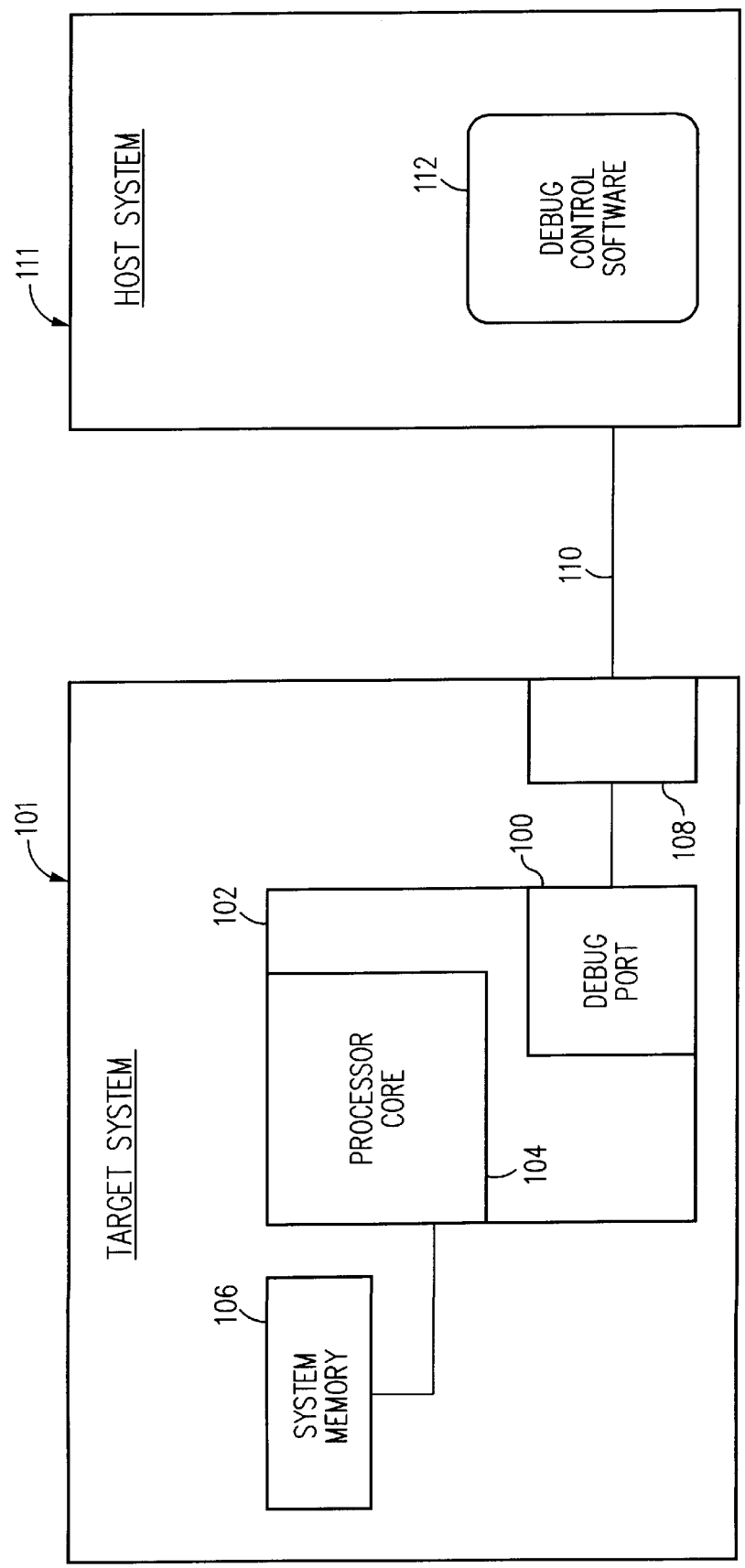
FIG. 1 is a schematic block diagram showing a software debug environment utilizing a software debug port according to an embodiment of the present invention.

Referring to FIG. 1, a schematic block diagram illustrates a software debug environment utilizing a debug port 100. A target system 101 is shown containing an embedded processor device 102 coupled to system memory 106. The embedded processor device 102 is an integrated debug interface for flexible, high-performance in an embedded hardware/software debug system. The embedded processor device 102 includes a processor core 104 and the debug port 100. In some embodiments, the embedded processor device 102 may incorporate additional circuitry (not shown) for performing application specific functions, or may take the form of a stand-alone processor or digital signal processor. In the illustrative embodiment, the debug port 100 includes an IEEE-1149.1-1990 compliant JTAG interface or other similar standardized serial port interface.

A host system 111 is used to execute debug control software 112 for transferring high-level commands and controlling the extraction and analysis of debug information generated by the target system 101. The host system 111 and target system 101 of the disclosed embodiment of the invention communicate via a serial link 110. Most computers are equipped with a serial or parallel interface which can be inexpensively connected to the debug port 100 by means of a serial connector 108, allowing most computers to function as a host system 111. In some embodiments, the serial connector 108 is replaced with higher speed JTAG-to-network conversion equipment.

Figure 2A:
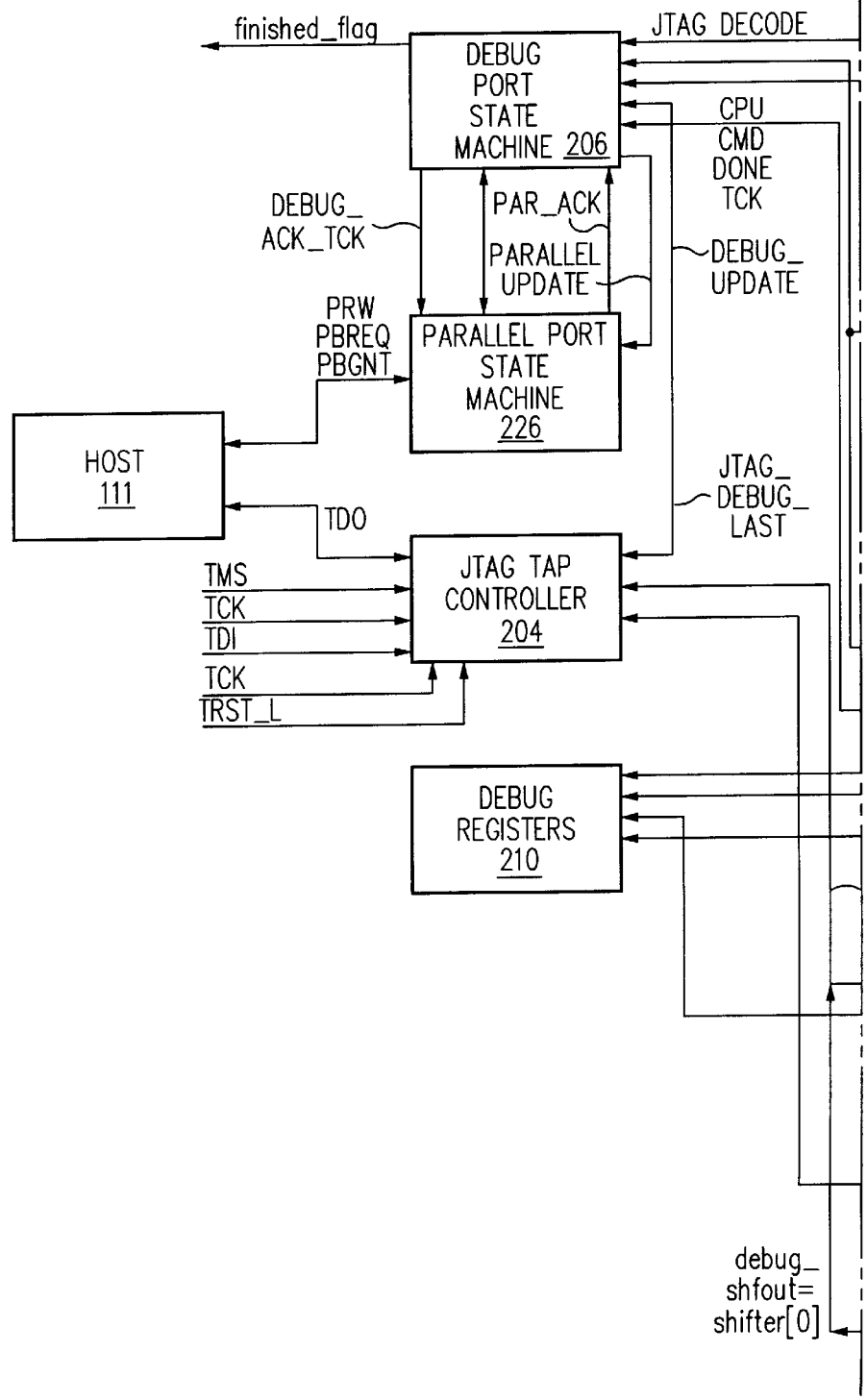
FIG. 2 is a schematic block diagram illustrating details of an exemplary embedded processor product incorporating a software debug port according to the present invention.
Figure 2B:
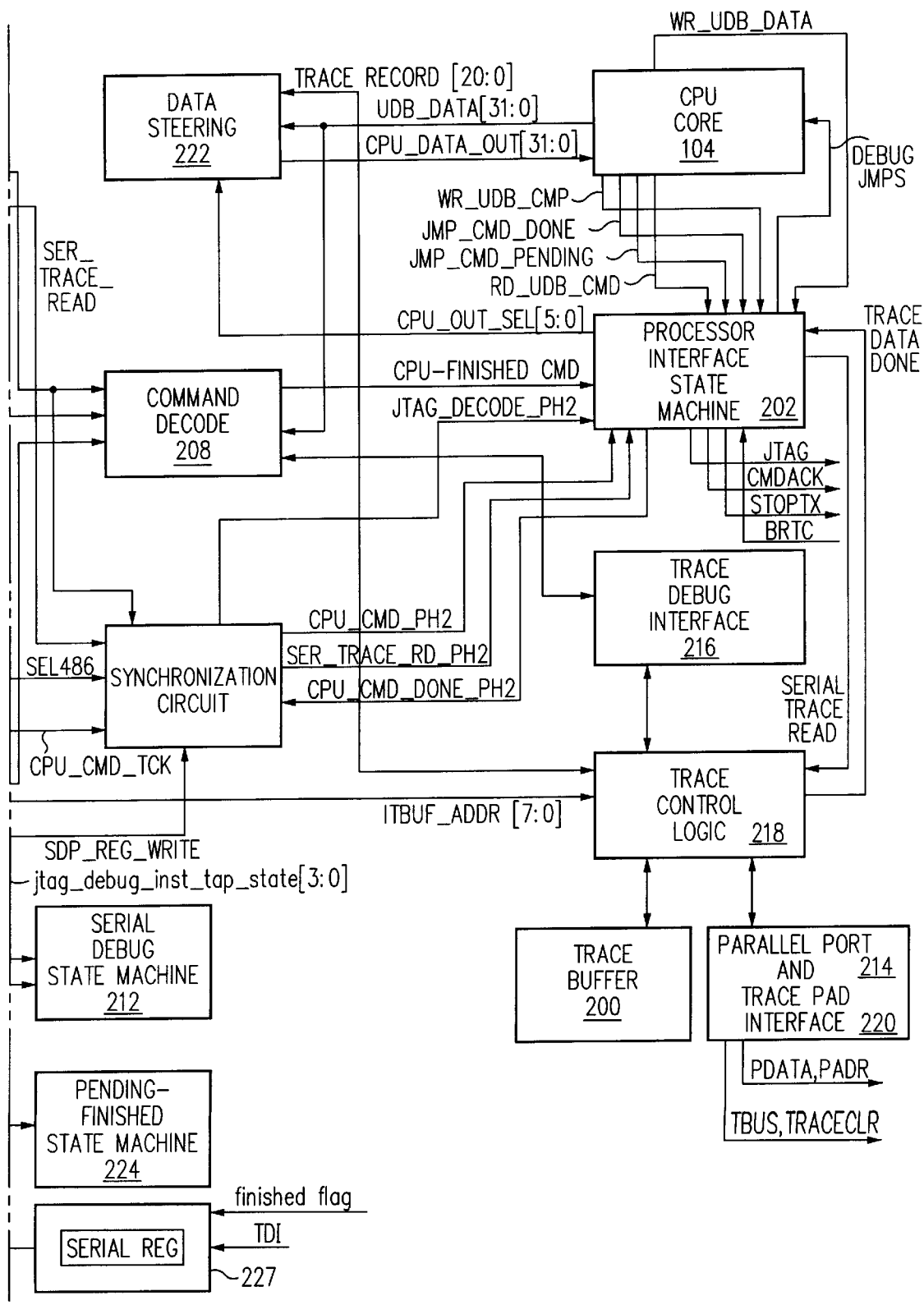

Referring to FIG. 2, a schematic block diagram illustrates the embedded processor device 102 in more detail, including the processor core 104 and various elements of the debug port 100 in an enhanced form. The embedded processor device 102 includes a plurality of state machines that communicate messages and data between a serial port of a JTAG TAP controller 204, a trace control circuit 218, and the processor core 104. In some embodiments, the embedded processor device 102 includes a parallel port 214 and the state machines similarly establish communication between the parallel port 214, the trace control circuit 218, and the processor core 104.

The state machines include a debug port state machine 206, a parallel port state machine 226, a processor interface state machine 202, and a pending/finished state machine 224. The state machines read the commands and data from the serial/parallel ports and direct decoding of the commands by a command decode and processing block 208 logic. Some commands, such as a command for reading data from memory, utilize processor core 104 intervention and are appropriately sent to the processor core 104. The state machines do not accept further commands until execution of a previous command is complete. Once the command is completed, a flag in a debug port state machine 206 block is asserted or an output pin is asserted to indicate command completion to the host system 111.

A minimal embodiment of the debug port 100 supports only conventional JTAG pins in a fast JTAG compliant interface that advantageously attains controllability and observability. The JTAG pins are a transportation mechanism that use existing pins to enter commands for performance by the processor core 104. Conventional JTAG pins carry conventional JTAG support signals that are well known in the art including a test clock signal TCK, a test mode select signal TMS, a test data input signal TDI, and a test data output signal TDO and JTAG reset pin TRST_L. The conventional JTAG pins are driven by a JTAG Test Access Port (TAP) controller 204.

The JTAG compliant serial interface is augmented for higher-speed access via supplemental sideband signals and a bond-out parallel interface with a 16-bit data path. Specifically, four pins are added to an embedded processor device 102 that supports JTAG functionality in a non-bondout package to fully support the enhanced 10-pin debug port 100 format. The enhanced embodiment of the debug port 100 supports the four additional pins carrying "sideband" signals including a command acknowledge signal CMDACK, a break request/trace capture signal BRTC, a stop/transmit signal STOPTX, and a trigger signal/trace-on signal TRIG/TRACE-ON to the standard JTAG interface. The additional sideband signals advantageously enhance performance and functionality of the debug port 100 by attaining highly precise external breakpoint assertion and monitoring, by triggering external devices in response to internal breakpoints, and by eliminating status polling of the JTAG serial interface. The TRIG pin is multiplexed to indicate the Trace-on/off status by setting a bit in the ITCR register. The sideband signals offer extra functionality and improve communications speeds for the debug port 100, but are optional and not utilized in the simplest embodiments of debug port 100 which uses conventional JTAG support signals. In the illustrative embodiment the sideband signals are used with an optional parallel port 214 provided on special bond-out versions of the embedded processor device 102.

Figure 3:
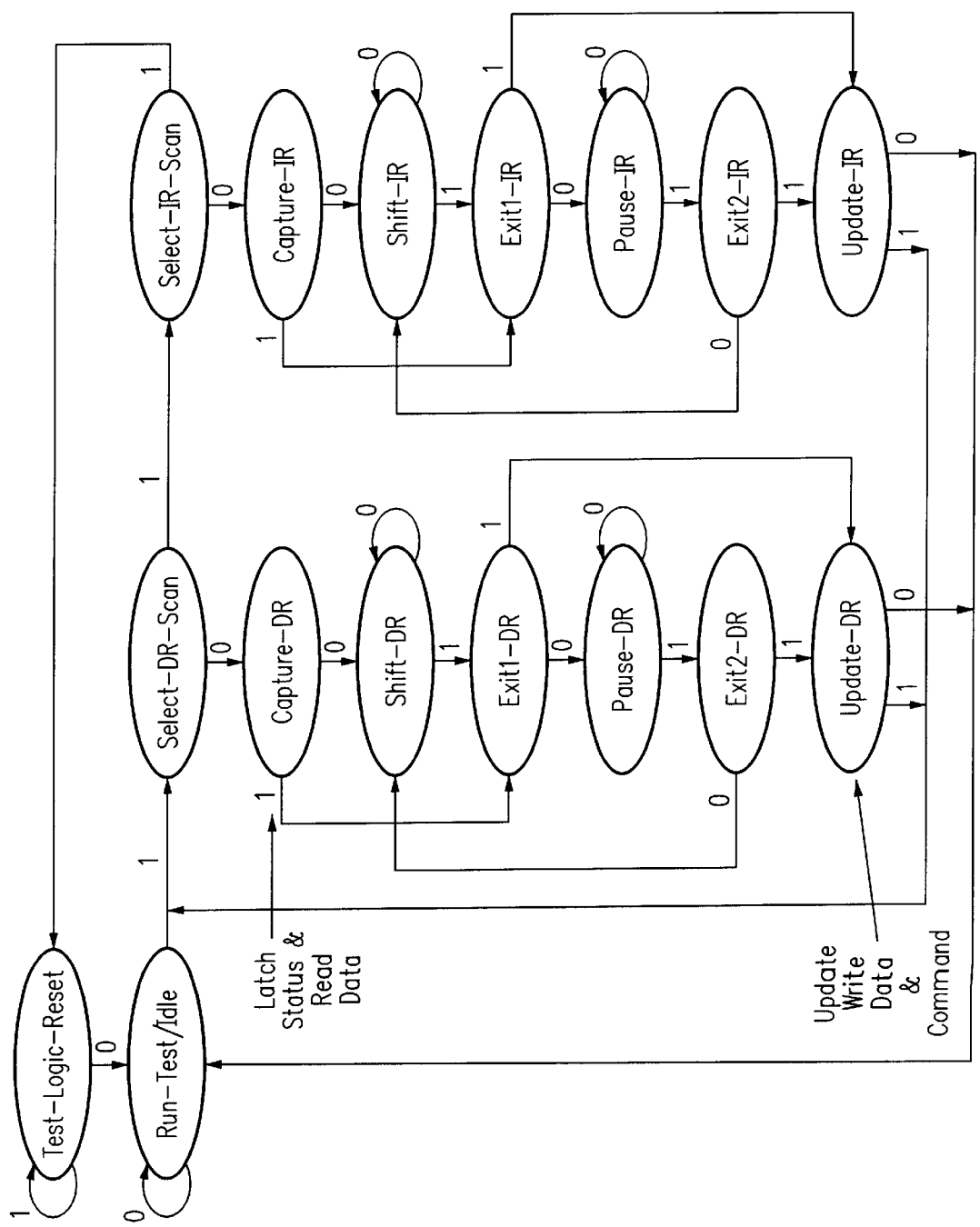
FIG. 3 is a state diagram illustrating a JTAG TAP controller state machine that is included in a JTAG TAP controller of the embedded processor product shown in FIG. 2.

Using conventional JTAG signals, the JTAG TAP controller 204 accepts standard JTAG serial data and control signals. When public JTAG DEBUG instruction is written to a JTAG instruction register (not shown) using a Capture IR-Update IR sequence in a JTAG TAP controller state machine that is shown in FIG. 3, the serial debug shifter 212 is connected to the JTAG TDI-TDO serial interface. A JTAG test data input signal TDI and a test data output signal TDO are received by the serial debug shifter 212 via the JTAG TAP controller 204 so that commands and data are loaded into debug registers 210 and read from the debug registers 210. In the disclosed embodiment, the debug registers 210 include two debug registers for transmitting (TX_DATA register) and receiving (RX_DATA register) data, an instruction trace configuration register (ITCR), and a debug control status register (DCSR), a soft address register for loading the serial/CPU register addresses. Data are typically read from the JTAG TAP controller 204 using a Capture DR-Update DR sequence in the JTAG TAP controller state machine.

The Instruction Trace Configuration Register (ITCR) is written to control enabling, disabling, and configuration of Instruction Trace debug functions. The ITCR is accessed through the serial/parallel debug register write/read commands or by using a reserved instruction MOV ITCR.

The Debug Control/Status Register (DCSR) indicates when the processor core 104 enters debug mode and allows the processor core 104 to be forced into debug mode using the enhanced JTAG interface. DCSR also includes miscellaneous control feature enable bits. DCSR is accessible only through the serial/parallel debug register write/read commands.

A debug port state machine 206 coordinates loading and reading of data between the serial debug shifter 212 and the debug registers 210. The debug port state machine 206 interfaces to the JTAG TAP controller 204 via a parallel port state machine 226. A command decode and processing block 208, and the processor interface state machine 202, in combination, decode commands and data and dispatch the commands and data to a data steering circuit 222 which, in turn, communicates with the processor core 104 and trace control circuit 218. The processor interface state machine 202 communicates directly with the processor core 104 and a trace control circuit 218. A parallel port 214 communicates with the debug port state machine 206 and the data steering circuit 222 to perform parallel data read and write operations in optional bond-out versions of the embedded processor device 102.

The trace control circuit 218 supplies trace information for reconstructing instruction execution flow in the processor core 104. The trace control circuitry 218 supports tracing either to a trace pad interface port 220, which is also called a DEBUG trace port 220, or to an internal trace buffer 200 and implements user control for selectively activating and deactivating trace functionality. The trace control circuitry 218 controls a trace pad interface port 220 which, in the illustrative embodiment, shares communication lines of the parallel port 214. When utilized, the trace pad interface port 220 supplies trace data while the processor 104 is executing instructions at the rate specified by the TCLK [2:0] bits in the ITCR register. On a CPU reset the TCLK[2:0] bits are loaded with a code signifying a CPU internal clock speed. A user subsequently may program the bits to select a clock speed. The trace control circuitry 218 enables other features including programmability of synchronization address generation and user specified trace records.

The trace buffer 200 improves bandwidth matching and reduces the need to incorporate throttle-back circuitry in the processor core 104. In one embodiment, the trace buffer 200 is a 256 entry first-in, first-out (FIFO) circular cache. Increasing the size of the trace buffer 200 increases the amount of software trace information that is captured.

The JTAG TAP controller 204 functions as an IEEE-1149.1-1990-compliant serial command port that serves as a primary mode of communication between a host processor 111 and target processor to a maximum TCK rate of 25 MHz. Before debug information is communicated via the debug port 100 using only conventional JTAG signals, the port 100 is enabled by writing the public JTAG instruction DEBUG into a JTAG instruction register contained within the JTAG TAP controller 204. After the DEBUG instruction is loaded into the JTAG TAP controller instruction register, a 38-bit dedicated data register that serves as a command/status/data interface with the SLE486 processor is connected between TDI and TDO pins. The serial command interface includes a 38-bit register including a 32-bit data field debug_data[31:0], a four-bit command field cmd[3:0] to point to various internal registers and functions provided by the debug port 100, a command pending flag (P), and a command finished flag (F). Some commands use bits of the debug_data field as a sub-field to extend the number of available commands. The pending and finished flags are controlled by a pending/finished state machine 224 that is connected to the serial port register shown below.

| 37              | 5 | 4        | 2 | 1 | 0 |
|-----------------|---|----------|---|---|---|
| debug_data[31:0] |   | cmd[3:0] |   | P | F |

Serial Port Register Organization

Figure 16:
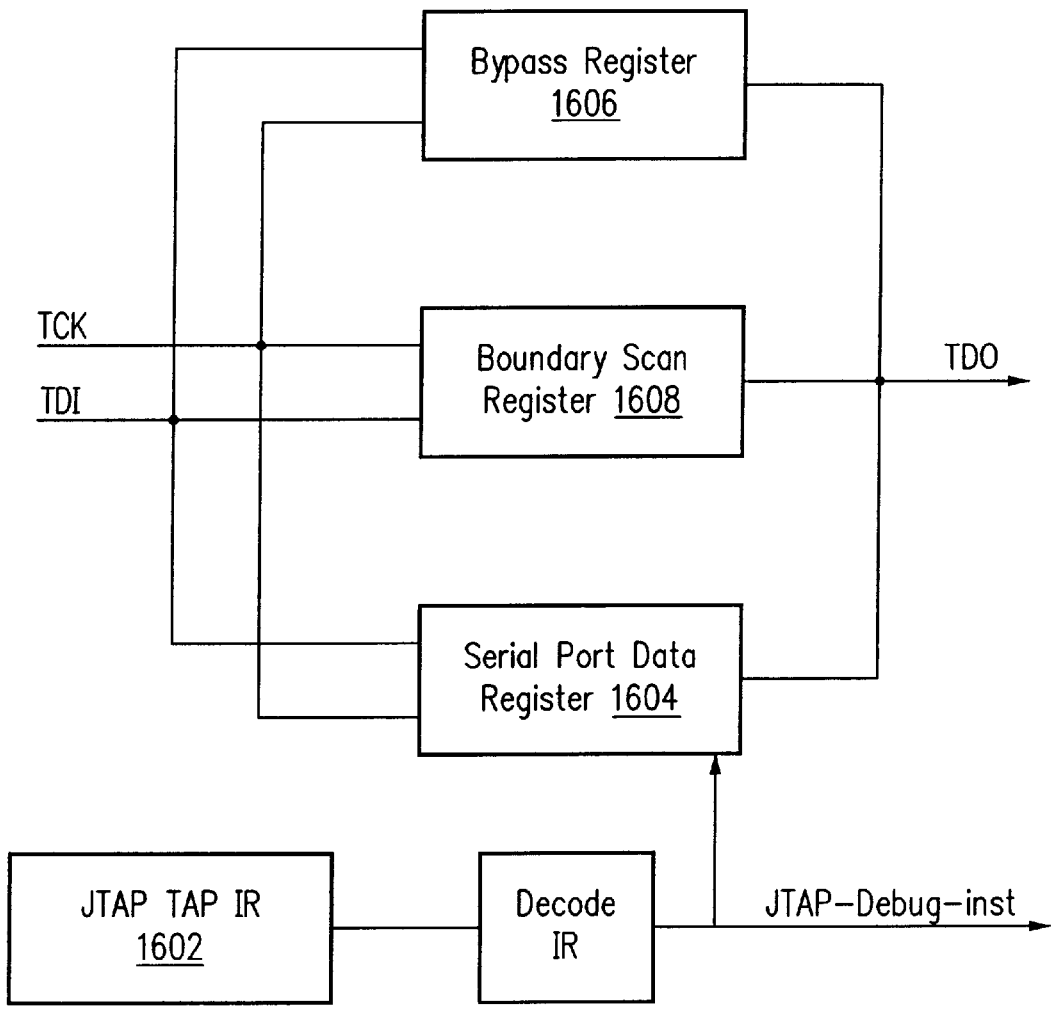
FIG. 16 is a schematic block diagram illustrating a circuit for generating a TDO signal from a TCK signal and a TDI signal.

Referring to FIG. 16, a schematic block diagram illustrates a circuit for generating a transmit data output signal (TDO) from a clock signal (TCK) and a transmit data input signal (TDI). The transmit data output (TDO) pin supplies a signal that is based on the values of a select_IR signal, the JTAG_debug_inst instruction, and an output signal from the debug registers 210. JTAG debug inst is decoded from the DEBUG instruction in a TAP_IR register 1602.

The select_IR signal is determined according to the following logical code implemented in a bypass register 1606 and a boundary scan register 1608:

select_IR=(tap_state=SEL_IR_SCAN)|tap_state=CAPTURE_IR|tap_state=SHIFT_IR|tap_state=EXIT1_IR|tap_state=PAUSE_IR|tap_state=EXIT2_IR|tap_state=UPDATE_IR).

The transmit data output (TDO) signal is determined, as follows:

TDO=!(select_IR & JTAG_debug_inst & debug_shfout).

where debug_shfout is bit 0 shifted output of the 38-bit serial port register 1604.

Commands and data are loaded into and read from the 38-bit serial-port register/shifter using the capture_DR-Update_DR sequence in the JTAG TAP controller state machine.

JTAG_debug_inst Register is enabled after DEBUG inst is written into the JTAG_TAP_IR Register.

A signal definition includes two sections, a standard section and a bond-out section. Standard signals are shown in TABLE I and are available for usage on all embedded processor device 102 integrated circuits. Bond-out signals are shown in TABLE II and are available only on specially-packaged parts, typically for usage by in-circuit emulation (ICE) vendors. A TBUS[18:0] is shared between the parallel port 214 and the trace pad interface 220. The remaining bond-out signals are dedicated to either the parallel port or the trace pad interface 220.

TABLE I

Standard Signals

| Name | I/O | Res | Sync Clock | Description |
|---|---|---|---|---|
| TCK | Input | PU | — | Clock for TAP controller and debug serial/parallel interface |
| TDI | Input | PU | TCK | Input test data and instructions |
| TD0 | Output | — | TCK | Output data |
| TMS | Input | PU | TCK | Test functions and sequence of test changes |
| TRST | Input | PU | Async | Test reset |
| BRTC | Input | PD | Async | Request entry to debug mode / On-Off switch for instruction trace capture. Function selected by BRKMODE bit in DCSR (optional) |
| CMDACK | Output | — | TCK | Acknowledge command (optional) |
| STOPTX | Output | — | Async | Asserted high on entry to DEBUG mode. Set high in NORMAL mode when data is to be transmitted to the host during OS/Application communication. |
| TRIG/TRACE-ON/OFF | Output | — | Async | Trigger event to logic analyzer (optional) / TRACE-ON/OFF STATUS when bit 14 in the ITCR register is set. |

TABLE 2

Bond-out Signals

| Name | I/O | Res | Sync Clock | Description |
|---|---|---|---|---|
| TRACECLK | Output | — | — | Instruction Trace record capture clock |
| TV | Output | — | TRACECLK | 0=Valid Trace record, 1=No Trace record. Pin is not shared with parallel bus interface |
| PDATA[15:0] | Bidir | — | TCK/ TRACECLK | Parallel debug port data path. Shared with pins TBUS[15:0]. |
| PADR[2:0] | Bidir | PD | TCK/ TRACECLK | Parallel debug port address. Shared with pins TBUS[18:16]. |
| PRW | Bidir | PD | TCK/ TRACECLK | Parallel debug port read/write select. Shared with pin TBUS[19]. 1=Parallel read from serial debug register. 0=Parallel write from serial debug register. |

TABLE 2-continued

Bond-out Signals

| Name | I/O | Res | Sync Clock | Description |
|------|-----|-----|------------|-------------|
| PBREQ | Output | — | TCK | 1=Request Host to enable parallel bus interface. 0=Request Host to disable parallel bus interface. Pin is not shared with Trace bus interface. |
| PBGNT | Input | PD | TCK | 1=Host-enabled parallel bus interface. 0=Host-disabled parallel bus interface. Pin not shared with Trace bus interface. |

Figure 4:
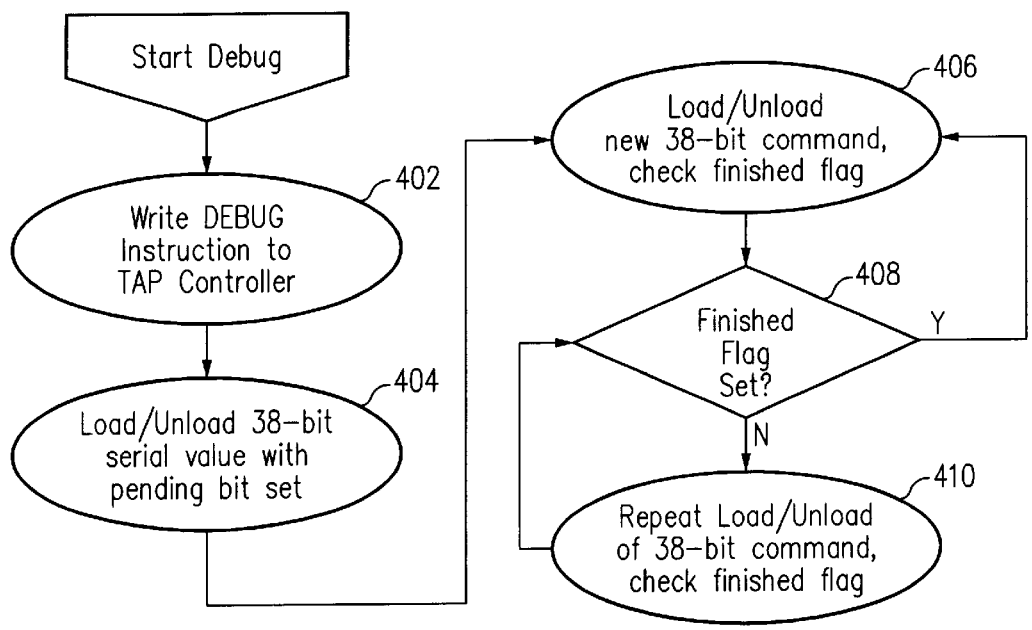
FIG. 4 is a state diagram illustrating states of a standard JTAG interface access operation.

Referring to FIG. 4, a state diagram illustrates a high-level flowchart of the host/serial port interface of the JTAG TAP controller 204 when using standard JTAG communication. The host system 111 writes a DEBUG instruction to the Instruction Register in the JTAG TAP controller 204 in operation 402. After the DEBUG instruction has been written the 38-bit serial port register is connected between TDI and TDO pins. Now the host begins to shift a 38-bit serial value into the 38-bit serial port register using the capture DR-Update DR sequence in the JTAG TAP controller state machine with the Command Pending Flag (P) asserted and data (if applicable, otherwise zero) in the data field in operation 404. Upon completing the command, which typically involves transferring a value between the data field of the 38-bit serial register and a predetermined processor register or memory/IO location in the processor core 104, the debug-port state machine clears the Pending flag (P=0) and asserts the Finished flag (F=1), simultaneously storing a value in the data field, if applicable. The entire 38-bit register is scanned out to monitor the Finished (F) and Pending (P) flags. If the Pending flag P is reset to zero and the Finished flag F is set to one, the previous command is finished. The status of the flags is captured during the Capture-DR TAP controller state shown in FIG. 3. A slave copy of the flag status is saved internal to the JTAG TAP controller 204 and checked in operation 406 to determine in logic state 408 whether the next instruction is to be loaded in the Update-DR TAP controller state. If the Finished flag (F) is set, a new 38-bit command is scanned in operation 406, otherwise the previous data scan is repeated in operation 410. A slave copy is maintained due to the possibility of the status changing between the Capture-DR and Update-DR TAP controller states. The processor saves the slave copy to determine the status the user will detect at the time the status capture is performed to prevent the loading of the next instruction if the user sees that the previous instruction has not finished.

Referring again to FIG. 2, the processor interface state machine 202 performs asynchronous control operations for adding the signals CMDACK, BRTC, STOP/TX, and TRIG/TRACE-ON/OFF to the standard JTAG interface. The CMDACK, BRTC, STOPTX, and TRIG/TRACE-ON/OFF signals are enabled when the DEBUG instruction is written to the JTAG instruction register in the JTAG TAP controller 204, but forced to a logic zero when disabled. The BRTC signal pin is supplied with an internal pull-down resistor (not shown).

Figure 5:
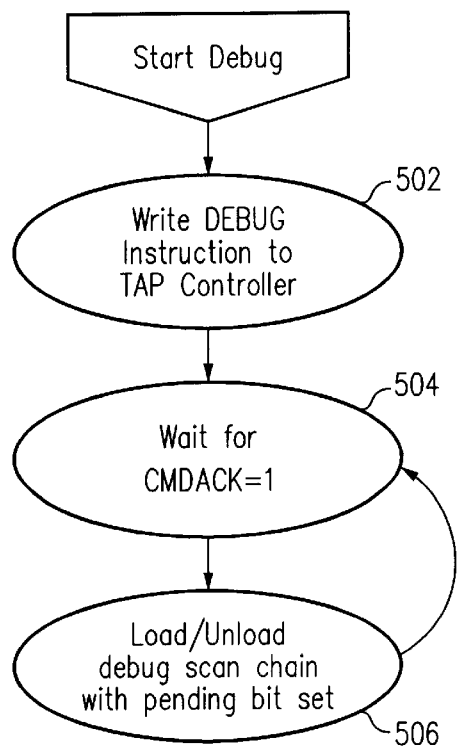
FIG. 5 is a state diagram illustrating states of an enhanced JTAG interface access operation.

Referring to FIG. 5, a flow diagram illustrates state operation of the enhanced JTAG interface. The host system 111 writes a DEBUG instruction to the JTAG TAP controller 204 in operation 502 then optionally monitors the output signal CMDACK to determine command completion status in a logic operation 504. The CMIDACK signal is asserted high simultaneous with assertion of the Finished flag (F) and remains high until the next command is shifted. When using the CMDACK pin, the Finished flag (F) status is captured without shifting out the serial port register in the serial debug port shifter block 227 since the CMDACK pin transitions high on the next rising edge of TCK after the real-time status of the Finished flag (F) changes from 0 to 1. The CMDACK signal is not delayed from the state saved during the previous Capture-DR state entry of the TAP controller state machine. Accordingly, in the enhanced JTAG mode a new shift sequence is not started in operation 506 until the CMDACK pin is asserted high. The CMDACK pin asserts high when the serial port is ready to receive instructions after the DEBUG instruction is loaded into the JTAG instruction register. The CMDACK signal is synchronous with the TCK signal. TCK is generally not clocked at all times, but is clocked continuously when waiting for a CMDACK response.

The BRTC input signal functions either as a break request signal or a trace capture enable signal depending on the BRKMODE bit in the DCSR. The BRTC signal, when set to function as a break request signal, is pulsed to cause the target system 101 to enter debug mode. If the BRTC signal is set to function as a trace capture enable signal, asserting the signal high activates the trace capture. Deasserting the BRTC signal deactivates the trace capture. The BRTC signal takes effect on the next instruction boundary after detection and is internally synchronized with the internal processor clock. The BRTC signal can be asserted at any time.

The TRIG/TRACE-ON/OFF output signal is optionally enabled to pulse whenever an internal breakpoint in the processor core 104 is asserted and if the corresponding enable bit is set in the ITCR register. The TRIG signal event is typically used to trigger an external capturing device such as a logic analyzer. When the processor core 104 generates a breakpoint, the TRIG output signal event is pulsed for two CPUCLK periods. When bit-14 in the ITCR register is set the TRIG/TRACE-ON/OFF pin is used to indicate the internal status of TRACE-ON/OFF.

The STOPTX output signal is asserted high when the target system 101 enters debug mode and is ready for register interrogation and modification, or memory or I/O reads and writes through the serial/parallel command interface. In a normal (nondebug) mode, the STOPTX signal is asserted high when the target system 101 is ready to transmit data during Operating System (OS) or Application communication. The STOPTX signal reflects the state of bit 7 or bit 11 in the debug control/status register (DCSR). The STOPTX signal is synchronous with JTAG TCK clock. When external instruction tracing through the bond-out DEBUG trace port is enabled, assertion of STOPTX is delayed until all data in the instruction trace buffer 200 is transferred out.

Referring again to FIG. 2, the parallel port 214 is a high-performance interface that is typically available in the bond-out version of the target system 101. The parallel port 214 supplies a 16-bit data path is intended to perform fast downloads and uploads between the host system 111 and the target system memory. The parallel port 214 is optionally used for all debug communication with the target system 101 whenever the processor core 104 is stopped. The serial port interface, either standard or enhanced, is used for debug access to the target system 101 when the processor core 104 is executing instructions or when the processor core 104 is stopped.

The parallel port 214 includes a 16-bit wide bi-directional data bus PDATA[15:O], a 3-bit address bus PADR[2:0], a read/write strobe PRW, and a request-grant pair PBREQ-PBGNT. The interface uses TCK (see Table 1) for synchronization of all transactions. TCK is continually clocked while the parallel debug interface is enabled.

The parallel port 214 is enabled by setting DCSR:3 to logic 1 via the serial port of the JTAG TAP controller 204. The serial port interface is not disabled when the parallel port is enabled and has mandatory usage for access while the processor core 104 is executing instructions. Any transaction started on the parallel port 214 completes on the parallel parallel port 214. Similarly, any transaction begun on the serial port of the JTAG TAP controller 204 also completes on the serial port.

All input signals to the parallel port 214 are sampled on the rising edge of TCK. All output signals are changed on the falling edge of TCK.

Figure 6:
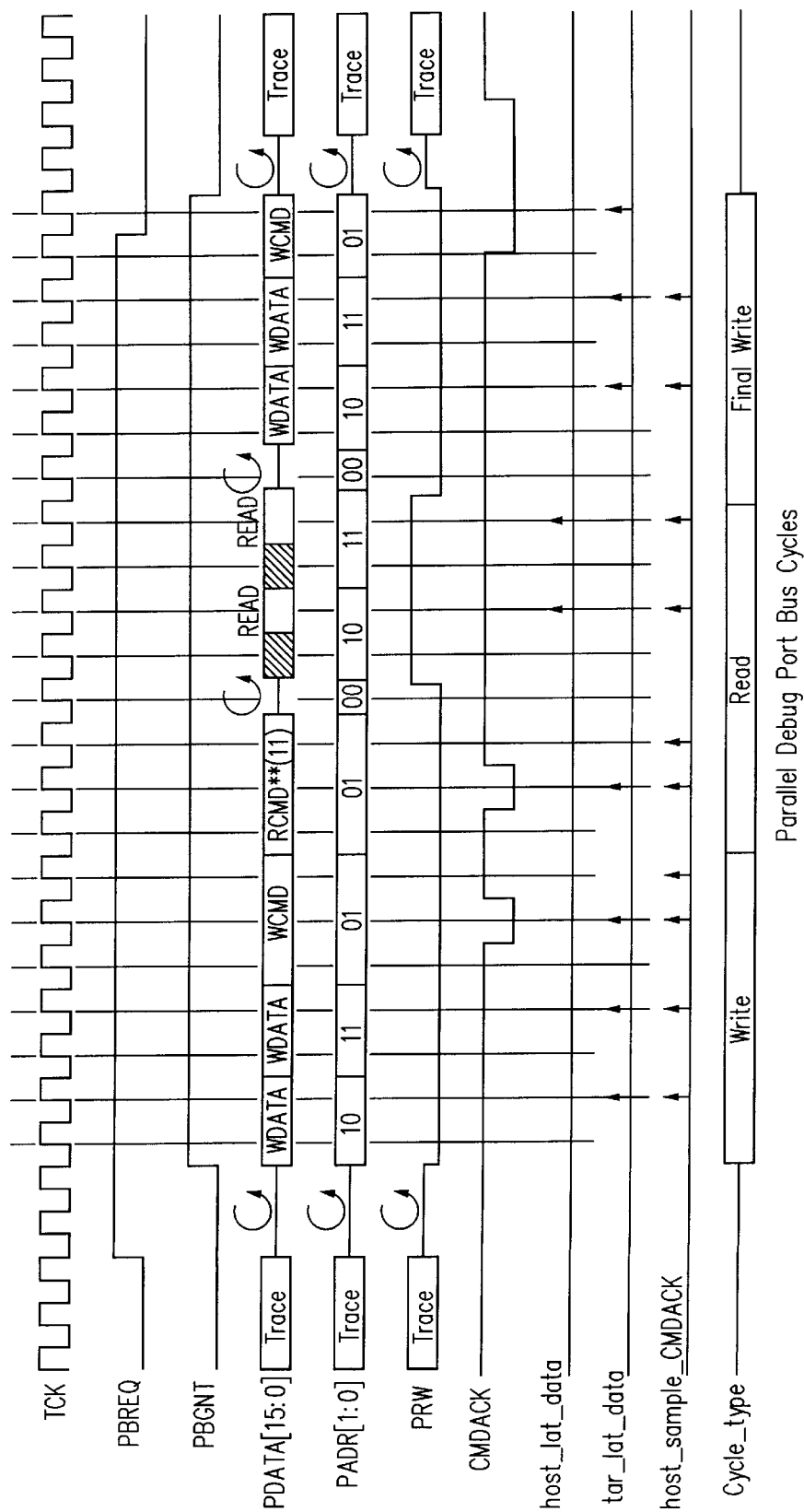
FIG. 6 is a timing diagram showing signal behavior for acquisition and release of a parallel debug bus.

Referring to FIG. 6, a timing diagram illustrates three complete bus cycles of signal behavior for acquisition and release of a parallel debug bus PDATA[15:0] and PADR [2:0]. Because pins are shared between the parallel port 214 and the DEBUG trace port 220, parallel port transmission commands are initiated only while the processor core 104 is stopped and the DEBUG trace port 220 is disconnected from the shared bus. A request-grant handshake pair of signals PB REQ/PB GNT are supplied to expedite turnaround of the shared bus signals between the DEBUG trace port 220 and the parallel port 214. When the host system 111 interface to the parallel port 214 determines that PBREQ is asserted high, the host system 111 is to begin driving the parallel port 214 signals and assert PBGNT. When PBREQ is deasserted, the host system 111 interface to the parallel port 214 responds by tri-stating host system 111 interface signals and deasserting PBGNT to indicate that the host system 111 interface is isolated from the bus. To prevent bus contention, devices driving the parallel port 214 are tri-stated whenever PBGNT is deasserted.

The PBREQ signal is asserted immediately after the debug mode entry when the parallel port is enabled and is deasserted after exiting the debug mode. When PBREQ is deasserted the CMDACK is not yet asserted until the PBGNT is deasserted. The parallel port 214 host interface responds to the PBREQ deassertion by tri-stating the parallel port 214 drivers and deasserting the PBGNT signal. The parallel port 214 controller then activates the DEBUG trace port pin drivers in the debug trace port 220, asserts the CMDACK signal, and returns control of the debug trace port 220 interface to the trace control circuit 218.

In FIG. 6, the abbreviations are as follows: WDATA= Write Data; READ=Read Data; WCMD=Write Command; RCMD=Read Command; and Trace=Instruction Trace Record. Host_lat_data is an illustrative signal showing when the host system latches read data. Tar_lat_data is an illustrative signal showing when the parallel port controller latches host data/commands and processor data. Host_sample_CMDACK is an illustrative signal showing when the host system samples CMDACK. Cycle_ is an illustrative signal showing the types of parallel bus cycles occurring in the diagram. PRW and PADR[1:0] must be driven stable on any rising TCK edge on which PBGNT is asserted. If PBGNT is asserted and PRW is low, PDATA[15:0] must also be driven stable on all rising edges of TCK.

For the Register Read command the register address is supplied in the debug_data register. The command should be preceded by the register address. These cycles are not shown in the timing diagram. These cycles are similar to the WDATA cycles shown for low 16-bits and high 16-bits for the WCMC. For memory Read operation the command is preceded by only low 16-bit WDATA cycles.

Figure 7:
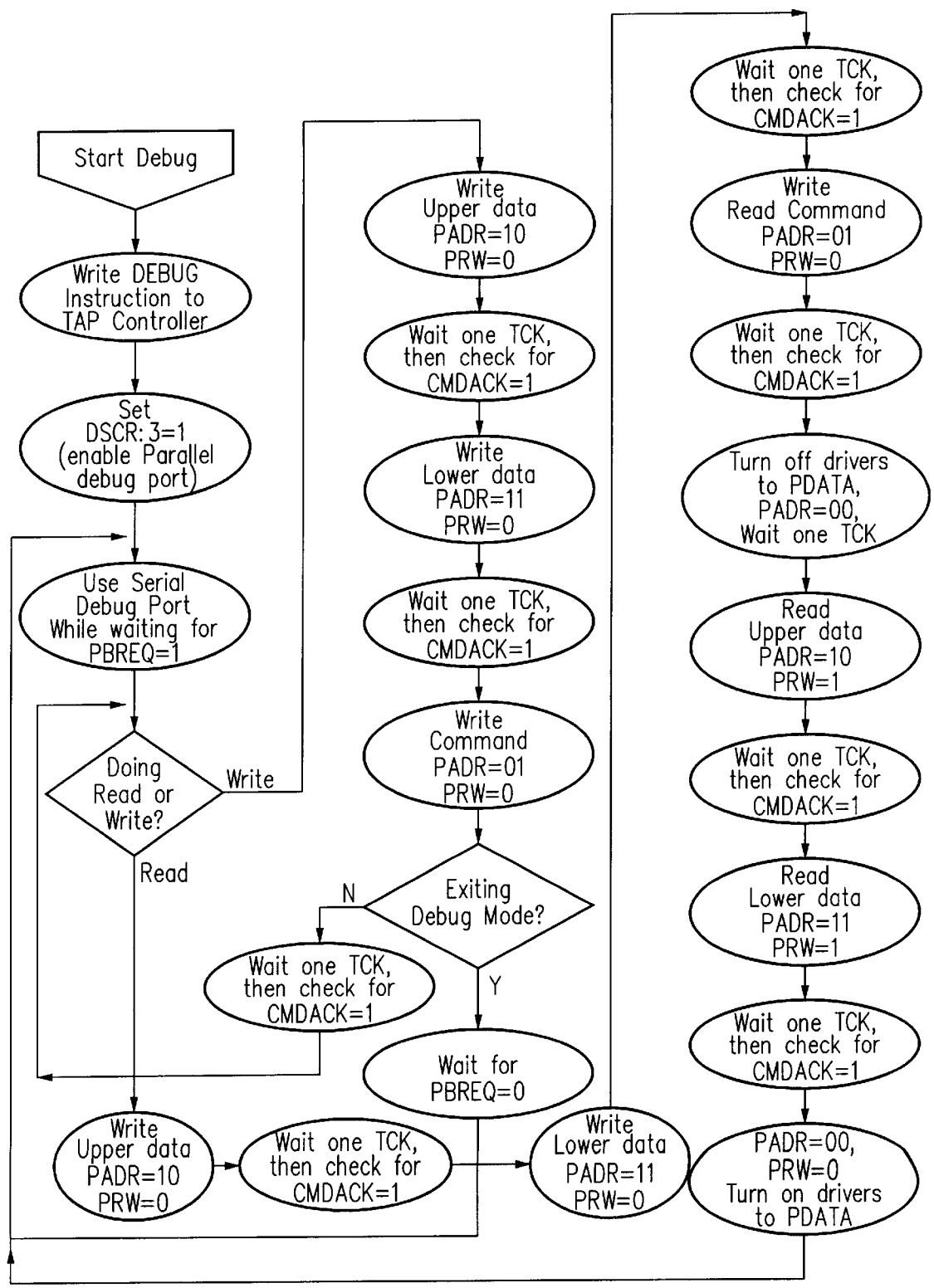
FIG. 7 is a flow chart depicting a parallel debug port interface protocol followed by the host system during communications via the parallel port.

Referring to FIG. 7, a flow chart depicts a parallel debug port interface protocol followed by the host system 111 during communications via the parallel port 214. Address pins PADR[2:0] select the field of the 38-bit internal debug register that is mapped to the 16-bit data bus PDATA[15:0]. The field is selected from among a null selection, the right 16 bits of debug data, the left 16 bits of debug data, and a four-bit command register (PDATA[3:0]). The internal pending flag (P) is automatically set when performing a write operation to the 4-bit command register, and is cleared when the Finished flag (F) is asserted. The host system 111 typically monitors the CMDACK pin to determine when the Finished flag (F) is asserted. On read cycles, PADR is set to 000 for one clock cycle before and after reading data to allow for bus turn-around.

The soft-address register should be loaded with values using load soft address register command to point to the various internal registers in the DEBUG Registers 210. The 38-bit serial register is accessible only via the serial/parallel debug interface. Some of the commands use bits from the debug data field as a sub-field to extend the number of available commands. Table 3 is a map of available functions.

TABLE 3

Serial/Parallel Debug Register Command Code Map

| Command Code | Definition |
| --- | --- |
| 0000 | Null (Not recognized by hardware, Finished flag not set) |
| 0001 | Load Soft Address register |
| 0010 | General register read |
| 0011 | General register write |
| 0100 | Serial/parallel Debug register read |
| 0101 | Serial/parallel Debug register write |
| 0110 | reserved |
| 0111 | Miscellaneous Serial/parallel Debug functions per debug_data[3:0] |
| 0 | Exit via RESET (hard reset) |
| 1 | Exit via SRESET (soft reset) |
| 2 | Instruction step (may destroy soft address). Bit 7 of the Debug Control/Status register or the external STOPTX pin is monitored to determine when the instruction step is completed. Unlike TF bit, the command steps into interrupts. |
| 3 | Peripheral reset (CPU not reset) |
| 4 | Read trace buffer at displacement given in soft address |
| 5 | Exit to instruction at EIP |
| * | Null |
| 1000 | 8-bit memory write to [soft address] |
| 1001 | 16-bit memory write to [soft address] |
| 1010 | 32-bit memory write to [soft address] |
| 1011 | 8-bit output to [soft address] (I/O cycle) |
| 1100 | 16-bit output to [soft address] (I/O cycle) |
| 1101 | 32-bit output to [soft address] (I/O cycle) |
| 1110 | Input or read per debug_data[3:0] |
| 0 | 8-bit read from [soft_address] |
| 1 | 16-bit read from [soft_address] |
| 2 | 32-bit read from [soft_address] |
| 3 | 8-bit input from [soft_address] (I/O cycle) |
| 4 | 16-bit input from [soft_address] (I/O cycle) |
| 5 | 32-bit input from [soft_address] (I/O cycle) |
| * | Null |

The Load Soft Address register command places a new 32-bit value for the soft address pointer in the debug data[3 1:0] field in combination with the command code and the pending bit (P). Debug logic transfers the data to the Soft Address register and asserts the Finished flag (F) and the CMDACK signal.

The Memory or I/O read or write command is issued following a command that sets an address and port designation in the Soft Address register. For a read command, data is transferred directly to the debug data register when the Finished flag (F) and CMDACK pin is set. For a write command, data is supplied in the debug data register in combination with the command in the Debug Command register. The address is postincremented by the appropriate size for any read/write transfer to allow block transfers without continually setting up the Soft Address. On memory accesses of a microcontroller with multiple physical memory spaces, the appropriate chipset mapping registers are set prior to issue of the access command. Memory accesses occur as data accesses. A memory access is directed either to normal memory space or SMM space based on the setting of the SMMSP bit in the DCSR register.

Issue of a General or Serial/parallel Debug Register Read command includes designation of a register address in the debug data register in combination with identification of the command in the Debug Command register. The address is transferred to the Soft Address register as a side effect to simplify read/modify/write setting of individual bits, and the register contents are transferred directly to the debug data register when the Finished flag/CMDACK pin is set.

For a General or Serial/parallel Debug Register Write command, the Soft Address is used to hold the register address. The soft address is set up with a previous Read Register or Load Soft Address command. The data to be written is supplied in the debug data register in combination with the command in the Command register.

The Read Trace Record command implements read access to the 256-record internal trace buffer 200 when the internal instruction trace configuration is selected. The read trace record command is not applicable to an external trace configuration since all trace record data is output to the bond-out DEBUG trace port upon generation. The read trace record command is invoked by setting bit 0 of the Instruction Trace Configuration Register (ITCR) to logic 1 to enable the instruction trace buffer 200, then the internal trace configuration is selected by setting bit 3 of the ITCR register to 0.

The Read Trace Record command reads the 21-bit trace record at the displacement given in the soft address register, places the record in bits 20:0 of the debug data register and asserts the finished flag and CMDACK pin. The soft address register is post-incremented so that a subsequent read retrieves the next location in the buffer in reverse order of history. A read operation from displacement 0 retrieves the most recent trace record. A read operation from displacement 255 retrieves the oldest trace record in the buffer. When the instruction trace buffer 200 is read, the valid bit on each record is to be checked. If the valid bit of a record is zero, an event that occurs only when one or more of the 256 locations of the buffer is not loaded with trace record data since last initialized, the record should be discarded. The trace buffer 200 wraps around and continually overwrites the oldest data when full. Once the buffer has wrapped around, all valid bits are set, and are cleared only when the TINIT bit (bit 2) in the Instruction Trace Configuration Register is set.

The Peripheral reset command sends a reset signal to all system logic except the processor core 104 to be pulsed active and released. The peripheral reset command allows peripheral logic to be reinitialized without resetting the processor core 104.

A command to enter or exit Debug mode enables and disables debug functionality. Debug functions are enabled by writing the DEBUG instruction to the JTAG TAP controller. When a DEBUG instruction is received, the debug serial port register is enabled to receive commands. While the processor is executing instructions only the Debug Control/Status register, Instruction trace configuration register, SOFT_ADDR register, RX_DATA, and TX_DATA registers are accessed through the serial interface. All serial debug registers become accessible when the processor has stopped. The processor may be stopped (forced into debug mode) by one of the following methods:

Setting bit 1 of the Debug Control/Status register (DCSR)

Pulsing the BRTC pin (low-to-high transition)

Via legacy processor core 104 debug registers DR0–DR3 after setting bit 4 of the Debug Control/Status register (DCSR). Single stepping with the TF bit set causes entry to debug mode when DCSR bit 4 is set. Moving to and from debug registers with the bit 12 of DR7 set causes entry to debug mode when DCSR bit 4 is set.

Executing a EDEBUG instruction. Inserting a EDEBUG instruction into the code stream enters debug mode at a specific, arbitrary point in source code. The processor core 104 is set in debug mode (DEBUG instruction is automatically written to the TAP controller). The EDEBUG instruction causes an invalid opcode execution if bit 12 of DR7 is not set.

The external pin STOPTX or bit 7 of the Debug Control/Status register (DSCR) is optionally monitored to determine when the processor enters debug mode. The flushing of cache on entry to debug mode is controlled by the DISFLUSH bit of DCSR. If the bit is reset the cache is flushed (using the SLE486 FLUSH pin) upon entry to debug mode. If the bit is set the cache is not flushed on entry to debug mode. On receipt of the STOPTX signal, either by sampling debug of the STOPTX pin or by polling DCSR bit 7, the host system 111 starts writing commands.

Debug mode is exited through command 0111. The exit options include:

Exit and begin execution at current value of EIP. In one example, the processor jumps to a section of patch code. A breakpoint is set at the end of the patch code to enable reentry to debug mode. In another example, the processor state is restored to the original debug entry state, using the general register write commands, before exiting.

Exit and perform a single instruction step. The processor executes a single instruction, takes a trap, and reenters debug mode.

Exit via a hard reset. A hard CPU reset is asserted immediately.

Exit via a soft reset.

The X86 Enhanced Software debug mode supplies a trace and breakpoint interrupt debug functionality on the processor core 104 without inclusion of external debug hardware. The mode is enabled by setting DR7 bit 12. The serial interface does not need to be enabled. When the X86 Enhanced Software debug mode is enabled, access and control of the instruction trace buffer 200 and the ITCR (Instruction Trace Control Register) are supplied through a set of reserved instructions. The instructions cause an illegal opcode exception if executed when DR7 bit 12 is not set.

Debug control and status is configured by setting the Debug Control/Status Register (DCSR) through the Serial/Parallel debug interface, using the serial/parallel debug registers read/write command, address 00. DCSR control and status bits are described, as follows:

Bit 0 (FRESET) is a reset bit allowing the host system 111 to completely reset all devices on the target system 101 other than the Serial/Parallel controller. FRESET is useful in the event of a total target system crash.

Bit 1 (FBRK) is a register version of the BRTC pin. The host system 111 writes a 1 followed by a 0 to FBRK to force a break into debug mode at the next instruction boundary following synchronization of the received command with the internal processor clock.

Bit 2 (DSPC) is a processor clock disable bit for disabling the stopping of internal processor clocks that normally occurs when entering Halt and Stop Grant states. DSPC allows the processor to continue to respond to break requests while halted or in the Stop Grant state.

Bit 3 (PARENB) is a parallel port enable bit that enables the auxiliary parallel data port. PARENB is not set on non bond-out versions of the target system 101.

Bit 4 (DBTEN) is a debug trap enable bit that causes entry into a hardware debug mode for all debug traps/faults of the processor core 104 that otherwise cause a software INT 1. The trace mode on/off toggling control in the ITCR has priority over DBTEN in that breakpoints mapped for trace mode on/off toggling are not affected by setting of DBTEN.

Bit 5 (BRKMODE) is a bit for controlling entry into debug mode. BRKMODE allows a developer to change the functionality of the BRTC pin to become an external control for enabling and disabling the trace capture operation. When the JTAG TAP controller 204 Instruction Register is programmed with a DEBUG instruction, the BRTC pin causes the processor core 104 to stop executing an instruction sequence and enter debug mode. Setting of the BRKMODE pin causes the BRTC pin to control activation of the trace capture operation. The trace capture status is designated by the TRON bit of the ITCR.

Bit 6 (FRCRDY) is a bit that controls forcing the RDY signal to the processor that is active to enable the processor to move on to the next bus cycle in cases where a bus operation to an undefined memory or I/O space has occurred in the absence of a subtractive decode agent. Use of FRCRDY is to be coordinated with chipset logic.

Bit 7 (STOP) is a stop bit that supports a software technique for checking the state of the STOPTX pin. When STOP reads back high, the processor is in debug mode and all debug commands are enabled.

Bit 8 (SMMSP) is an SMM control bit that allows memory accesses initiated through the debug port 100 to take place in the SMM space. When SMMSP is reset, memory accesses initiated through the debug port 100 apply to the normal memory address space. Setting Of SMMSP causes memory accesses initiated through the debug port 100 to apply to the SMM address space.

Bit 9 (DISFLUSH) is a control bit for controlling flushing of a cache on entry to debug mode. With DISFLUSH reset the cache is flushed on entry to debug mode. Setting DISFLUSH prevents the cache from flushing on entry to debug mode.

Bit 10 (RX) is a data received bit that indicates whether data has been received from the host system 111 so that the processor core 104 can read the data from the RX_DATA register.

Bit 11 (TX) is a data transmit bit that indicates the processor core 104 is ready to transmit data so that the host system 111 can read the data from the TX_DATA register.

Communication between an operating system (OS) and Applications via the JTAG Debug port 100 is initiated by the host system 111 writing the DEBUG instruction to the JTAG instruction register in the JTAG TAP controller 204. Writing of the DEBUG instruction causes the Serial Debug Shifter 212 to connect to the JTAG TDI-TD0 serial interface of the JTAG TAP controller 204. The serial debug port 100, includes two debug registers for transmitting (TX_DATA register) and receiving (RX_DATA register) data. TX_DATA and RX_DATA are accessed using the soft address and serial/parallel debug register commands.

The processor core 104 initiates a data transmission by first testing the read-only TX bit in the ITCR register. If the TX bit is set to 0 then the processor core 104 executes an X86 instruction to transfer the data to the TX_DATA register. The serial port 100 sets the TX bit in the DCSR and ITCR registers indicating to the host system 111 data is ready for transmission. The serial port 100 also sets the STOPTX pin to high. After the host system 111 completes reading the transmit data from the TX_DATA register, the TX bit is set to 0. A TXINTEN bit in the ITCR register, when set, generates a signal to interrupt the processor core 104. The interrupt is generated only when TX bit in the ITCR register makes a transition to 0.

The communication is accomplished by the host system 111 writing the DEBUG instruction to the JTAG instruction register in the JTAG TAP controller 204, causing the Serial Debug Shifter 212 to connect to the JTAG TDI-TDO serial interface. Two of the debug registers 210 are available in the serial debug port 100 for the processor core 104 to transmit (TX_DATA register) data and receive (RX_DATA register) data from the host system 111. The receive and transmit data registers are accessed using the soft address and serial/parallel debug register commands.

When the processor core 104 attempts to transmit the data, the processor core 104 first tests the TX bit in the ITCR register. If the TX bit is set to 0, the processor core 104 executes an X86 instruction to transfer the data to the TX_DATA register. The serial port 100 sets the TX bit in the DCSR and ITCR registers indicating to the host system 111 a readiness to transmit data, and asserts the STOPTX pin active high. After the host system 111 completes reading the transmit data from the TX_DATA register the TX bit is set to 0. A TXINTEN bit in the ITCR register, when set, generates a signal to interrupt the processor core 104. An output pin RXTX_INTR is used to assert the interrupt. The interrupt is generated only when TX bit in ITCR makes a transition to 0. The TXINTRSTATUS bit in the ITCR register is set to 1. The interrupt output pin RXTX_INTR is active high and remains active until the processor core 104 services the interrupt by reading the ITCR register. The processor core 104 detects that the TXINTRSTATUS bit set to 1 in the ITCR register and services the TX interrupt. At the end of the TX interrupt service the processor core 104 sets the TXINTRSTATUS bit to 0, acknowledging completion of service of the TX interrupt.

When the processor core 104 writes a 0 to the TXINTRSTATUS bit, logic of the serial port 100 updates the bit in the ITCR only if the processor core 104 has previously read a 1 value at the beginning of the service routine. The interrupt pin RXTX_INTR is deasserted after the processor core 104 sets the TXINTRSTATUS bit set to 0 in the ITCR register. When the TXINTEN bit is not set, the processor core 104 polls the ITCR register and monitors the TX bit to further transmit the data.

When the host system 111 attempts to send data, the host system 111 first tests the RX bit in the DCSR register. If RX bit is set to 0, then the host system 111 writes the data to the receive data (RX_DATA) register and the serial port 100 sets the RX bit to 1 in the DCSR and ITCR registers. A RXINTEN bit in the ITCR register, when set, generates a signal to interrupt the processor core 104. An output pin RXTX_INTR is used to assert the interrupt. The interrupt is only generated when RX bit in the DCSR makes a transition to 1. The RXINTRSTATUS bit in the ITCR register is set to 1. The interrupt output pin RXTX_INTR is active high and remains active until the processor core 104 services the interrupt by reading the ITCR register. The processor core 104 detects that the RXINTRSTATUS bit set to 1 in the ITCR register and services the RX interrupt. At the end of the RX interrupt service, the processor core 104 sets the RXINTRSTATUS bit to 0, acknowledging completion of service for the RX interrupt.

When the processor core 104 writes a 0 to the RXINTRSTATUS bit, logic in the serial port 100 updates the bit in the ITCR only if the processor core 104 has previously read a 1 at the beginning of the service routine. The interrupt pin RXTX_INTR is deasserted only after the processor core 104 sets the RXINTRSTATUS bit set to 0 in the ITCR register. When RXINTEN bit is not set, the processor core 104 polls the ITCR register, monitors the RX bit, and if the RX bit is set to 1 the processor core 104 executes an X86 instruction to read the data from the receive data (RX_DATA) register. ARer the data is read by the processor core 104 from the RX_DATA register, the RX bit is set to 0 by the serial port 100. The host system 111 continuously reads the DCSR register and monitors the RX bit to further send the data.

Both the RX and TX bits can be set concurrently. If so, the RXTX_INTR interrupt output is asserted. The host system 111 might complete reading the TX_DATA register when the processor core 104 is servicing the RX interrupt. For interrupt controllers that are edge sensitive, a problem occurs because the RXTX_INTR output signal is not asserted for the pending TX interrupt after the RX interrupt is serviced. To overcome the problem, a FRCDISINTR bit is defined in the ITCR register. If the interrupt controller logic is level sensitive, the FRCDISINTR bit need not be used. The FRCDISINTR bit is utilized because of the sharing of the RX and TX interrupts on one output RXTX_INTR pin. When the processor core 104 begins servicing of the interrupt because of the RXTX_INTR pin going active, the processor core 104 sets FRCDISINTR bit to 1 at the beginning of the service routine. At the end of the service routine, the processor core 104 sets the FRCDISINTR bit to 0. If an interrupt is pending during the service routine, the interrupt is disabled and then immediately activated when the FRCDISINTR bit is set 0, in turn causing the RXTX_INTR output signal to go active. The processor core 104 then services the pending interrupt. The RXTX_INTR output signal is asynchronous and remains active until the processor core 104 services the interrupt and sets the TXINTRSTATUS or RXINTRSTATUS bit to 0.

The RX and TX bits in the DCSR and ITCR are read-only bits. The serial port 100 sets and resets the bits. The RXINTRSTATUS, TXINTRSTATUS, and FRCDISINTR bits in the ITCR are read-only bits for the host system 111. The processor core 104 and serial port 100 write the RXINTRSTATUS, TXINTRSTATUS, and FRCDISINTR bits.

Serial/Parallel Debug Register Descriptions

The Instruction Trace Configuration Register (ITCR)

The ITCR register controls enabling/disabling and configuration of Instruction Trace debug functions. The ITCR register is accessed through the serial/parallel debug register write/read commands, at location 01, or via the reserved instruction MOV ITCR.

| BIT | Symbol | Initial State | Description | Function |
|---|---|---|---|---|
| 31 | RXINTRSTATUS | 0 | RX Interrupt status when RX interrupt is enabled. | RX Interrupt status when RX interrupt is enabled.<br>1 = RX Interrupt is active when RXINTEN is set to 1.<br>0 = RX Interrupt is inactive when RXINTEN set to 1. |
| 30 | TXINTRSTATUS | 0 | TX Interrupt Status when TX Interrupt is enabled. | TX Interrupt status when TX Interrupt is enabled.<br>1 = TX Interrupt is active when TXINTEN is set to 1.<br>0 = TX Interrupt is inactive when TXINTEN set to 1. |
| 29 | RXINTEN | 0 | Enable Interrupt when RX bit is set | Enables Interrupt when RX bit is set.<br>1 = Enable Interrupt when RX bit is set to 1.<br>0 = Disable Interrupt when RX bit is set to 1. |
| 28 | TXINTEN | 0 | Enable Interrupt when TX bit is set | Enables Interrupt when TX bit is set.<br>1 = Enable Interrupt when TX bit is set to 0.<br>0 = Disable Interrupt when TX bit is set to 0. |
| 27 | TX | 0 | Transmitting Data | Indicates that the target is ready to transmit data to the host and the data is available in the transmit data register:<br>1 = Ready to transmit data.<br>0 = No data is available for transmission. |
| 26 | RX | 0 | Received Data | Indicates that the data has been received from the host and is placed in the receive data register.<br>1 = Received Data from host.<br>0 = No data has been received from host. |
| 25 | DISL1TR | 0 | Disable level 1 tracing | 0 = Trace record generation not disabled on transitioning to level 1<br>1 = Trace record generation disabled when in level 1 |
| 24 | DISL0TR | 0 | Disable level 0 tracing | 0 = Trace record generation not disabled on transitioning to level 0<br>1 = Trace record generation disabled when in level 0 |
| 23 | FRCDISINTR | 0 | Deactivate the pending interrupt when servicing the interrupt. This bit is to support edge-sensitive interrupt controller logic. | 1 = Deactivates the pending interrupt when servicing the interrupt.<br>0 pending interrupt is not disabled when servicing the interrupt. |
| 22: | TSYNC | 08h | Trace synchronization | The value programmed in this register sets the |

-continued

| BIT | Symbol | Initial State | Description | Function |
|---|---|---|---|---|
| 16 | [6:0] | | force count | maximum number of Branch Sequence trace records (TCODE = 1) that may be output by the trace record generator before a synch address record is forced. |
| 15: 14 | Reserved | 0 | Reserved | Reserved |
| 14 | TRACE/ ON-OFF | 0 | TRACE ON/OFF STATUS | When this bit is set the TRIG pin is used to indicate TRACE-ON/OFF STATUS |

The host system 111 sends data to the processor core 104 by first testing the read-only RX bit in the DCSR register. If the RX bit is set to 0, then the host system 111 writes the data to the receive data (RX_DATA) register and the serial port 100 sets the RX bit to 1 in the DCSR and ITCR registers. The RXINTEN bit in the ITCR register, when set, generates a signal to interrupt the processor core 104. The interrupt is only generated when RX bit in the DCSR makes a transition to 1. When the RXINTEN bit is not set, the processor core 104 polls the RX bit of the ITCR register. If the RX bit is set to 1, the processor core 104 executes an X86 instruction to read the data from the receive data (RX_DATA) register. After data is read by the processor core 104 from the RX_DATA register, the RX bit is set to 0 by the serial port 100. The host system 111 continuously reads the DCSR register and monitors the RX bit to continue sending data.

Figure 8:
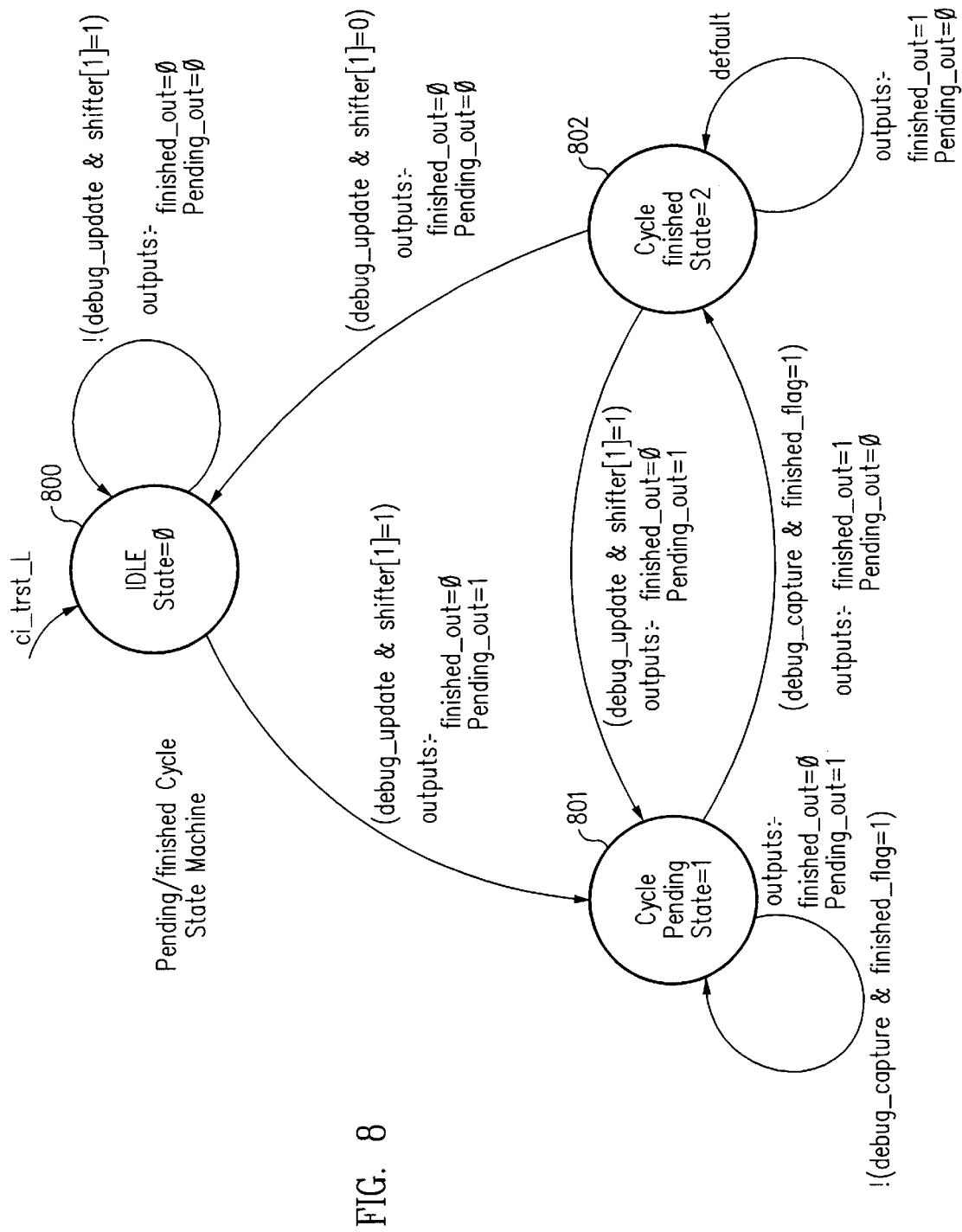
FIG. 8 is a schematic state diagram illustrating operating states of the pending/finished state machine shown in FIG. 2.

Referring to FIG. 8, a schematic state diagram illustrates operating states of the pending/finished state machine 224. The 38-bit serial register in the serial debug port shifter 227 operates as a serial command interface including the 32-bit data field, the 4-bit command, the command pending flag (P), and the command finished flag (F). The 32-bit data, 4-bit command, and the pending flag are shifted serially into the 38-bit serial shift register using the shift-DR state in the JTAG TAP controller. When the TAP controller enters the Update-DR state the 38-bit data is loaded into the internal data and command registers. The command pending flag is set. For commands that do not include a data transfer, bits in the data field are set to 0. The pending/finished state machine 224 enters and Idle state (state=0) 800 immediately after the TRST_L JTAG input signal is asserted (See the JTAG standard signals designated in TABLE I). After shifting the 38-bit data, when the JTAG TAP controller 204 is in the Update-DR state and the pending flag is set (P=1), the state machine enters Cycle Pending state (state=1) 801.

The pending/finished state machine 224 transitions to a Cycle Finished state (state=2) 802 when the JTAG TAP controller 204 is in the Capture-DR state and an indication occurs that the previous command is completed. The 38-bit serial debug shifter 227 is loaded with the 32-bit output data, the finished flag is set to 1 (F=1), and the command field cmd[3:0] (4'b0000) and the pending flag are set to 0.

When the pending/finished state machine 224 is in the Cycle Finished state 802, the JTAG TAP controller 204 is in the Update-DR state, and the Pending Flag is set to 1 (P=1), then the pending/finished state machine 224 transitions to the Cycle Pending State(state=1) 801. Signals that set the finished flag (F) and pending flag (P) in the 38-bit shifter are set to 0 and 1, respectively. If the JTAG TAP controller 204 is in the Update-DR state and the Pending Flag is set to 0 (P=0), then the pending/finished state machine 224 transitions to the Idle State (state=0) 800. Signals that set the finished flag (F) and pending flag (P) are set to 0. Otherwise, the pending/finished state machine 224 in the Cycle Finished state 802. Signals that set the finished flag (F) and pending flag (P) are set to 1 and 0, respectively.

Figure 9:
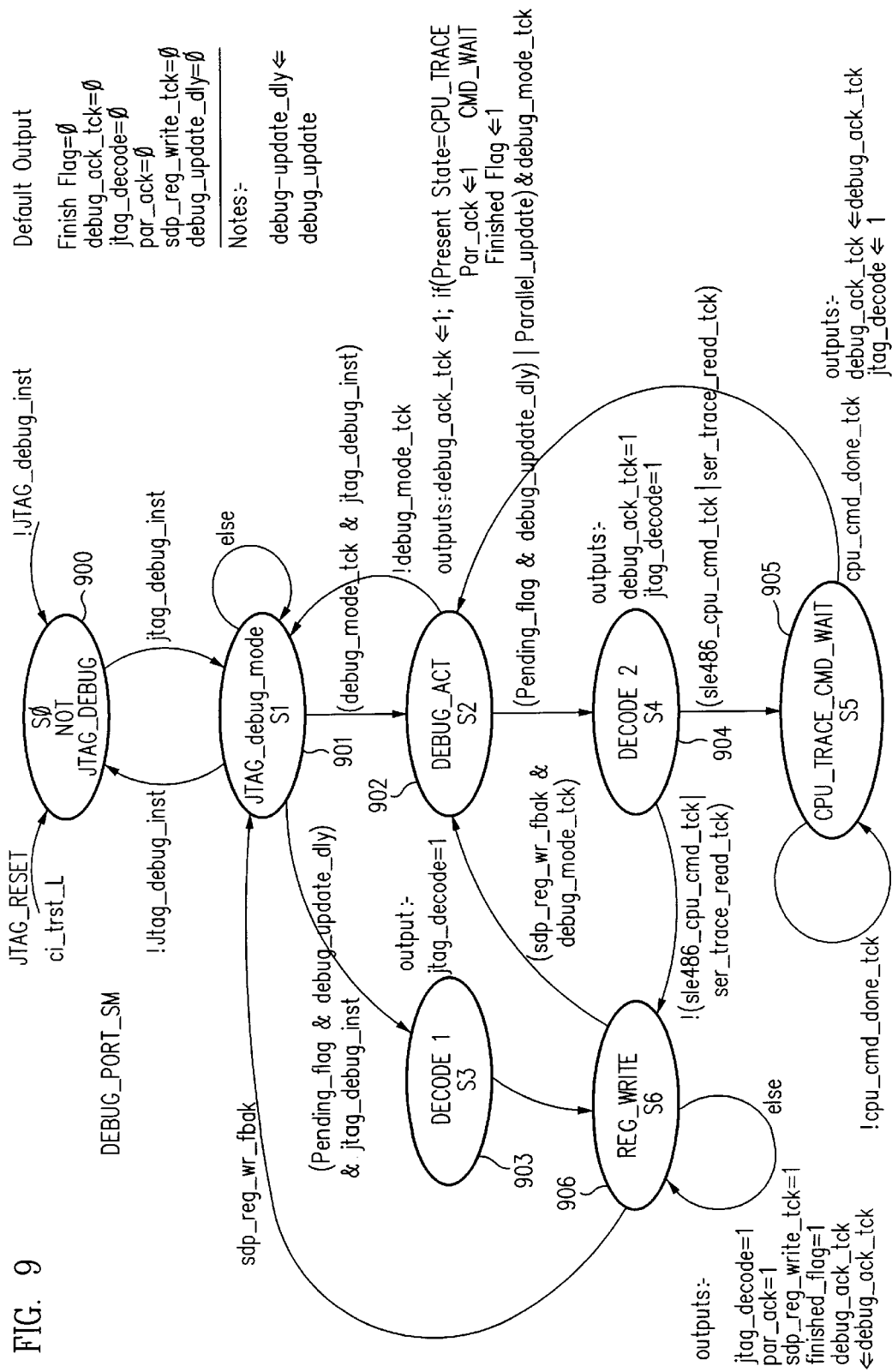
FIG. 9 is a schematic state diagram illustrating operating states of the debug port state machine shown in FIG. 2.

Referring to FIG. 9, a schematic state diagram depicts operating states of the debug port state machine 206. The debug port state machine 206 interfaces with the pending/finished state machine 224, the parallel port state machine 226, the processor interface state machine 202, and the command decode and processing block 208. The debug port state machine 206 generates output signals for command decoding and generates debug register clock signals for register write operations. The debug port state machine 206 issues a signal to the parallel port state machine 226 and the pending/finished state machine 224 when the command is completed.

A JTAG reset, a reset of the JTAG TAP controller 204, is generated by a TRST_L signal of the standard JTAG signals. Upon a JTAG reset, the debug port state machine 206 enters a Not JTAG Debug State (state=0) 900. When the host system 111 writes a DEBUG private instruction to the JTAG instruction register using the Capture-IR-Update IR sequence shown in the JTAG TAP controller state machine shown in FIG. 3, a JTAG debug instruction state variable is set to 1 and the debug port state machine 206 transitions to a JTAG Debug Mode state (state=1) 901.

In the JTAG Debug Mode state 901, if the Pending flag is set (P=1), the TAP controller state in the previous cycle was Update-DR, and the JTAG debug instruction state variable is equal to 1, then the debug port state machine 206 transitions to a Decode 1 state (state=3) 903. and sets a JTAG decode output signal to 1. If the processor core 104 is in a debug mode so that a Debug Mode TCK signal is asserted and the JTAG debug instruction state variable is asserted, then the debug port state machine 206 transitions to a Debug Active state (state=2) 902 and sets a debug acknowledge TCK output signal to 1 with the finished flag (F) holding to the same value as in the previous state. If the JTAG debug instruction state variable is equal to 0, then the debug port state machine 206 transitions back to the Not JTAG Debug State (state=0) 900.

When the debug port state machine 206 is in the Debug Active state 902, several state transitions are possible. If a command is written either through the JTAG TAP controller 204 or the parallel port 214, and the processor core 104 is in the debug mode so that the Debug Mode TCK signal is asserted, the debug port state machine 206 transitions to a Decode 2 state (state=4) 904. Upon entering the Decode 2 state 904, the JTAG decode output signal is set to 1 and the debug acknowledge TCK signal is set to 1, acknowledging entry to the debug mode to the parallel port state machine 226. If the processor core 104 leaves the debug mode which is indicated by the Debug Mode TCK signal being deasserted to 0, then the debug port state machine 206 transitions back to the JTAG Debug Mode state 901 and the output Finished flag (F) is set to the previous value. If the debug port state machine 206 transitions to the Debug Active state 902 from a CPU Trace Command Wait state (state=5) 905, then a parallel port acknowledge signal is asserted to 1 and the finished flag is asserted (F=1). The parallel port acknowledge signal is an acknowledgment to the parallel port state machine 226 indicating that the previous CPU/TRACE command has completed execution.

In the Decode1 state 903, the debug port state machine 206 transitions to a Register Write state (state=6) 906 in the next clock cycle and sets a JTAG decode output signal to 1 indicating for the command decode and processing block 208 to decode the received command. Also in the transition to the Register Write state 906, the parallel port acknowledge signal is asserted to 1, the debug acknowledgment TCK signal retains the value of the previous cycle, a serial debug port (SDP) register write TCK clock signal is asserted to 1, and the finished flag is asserted (F=1).

In the Decode2 state (state=4) 904, if the command decoded by the command decode and processing block 208 is a CPU command or a serial trace read command, the debug port state machine 206 transitions to the CPU Trace Command Wait state (state=5) 905, the JTAP decode output signal is asserted to 1, and the debug acknowledgment TCK signal retains the value of the previous cycle. If the decoded command is not a CPU command or a serial trace read command, the debug port state machine 206 transitions to the Register Write state 906 and the JTAG decode output signal is asserted to 1, the parallel port acknowledge signal is asserted to 1, the debug acknowledgment TCK signal retains the value of the previous cycle, the serial debug port (SDP) register write TCK clock signal is asserted to 1, and the finished flag is asserted (F=1).

When the debug port state machine 206 is in the CPU Trace Command Wait state (state=5) 905 waiting for the CPU command or the serial trace command to complete and if a CPU command done TCK signal is asserted to 1, then the debug port state machine 206 transitions to the Debug Active state 902. In the transition to the Debug Active state 902, the debug acknowledgment TCK signal is asserted to 1, the finished flag is asserted (F=1), and the parallel port acknowledge signal is asserted to 1.

In the Register Write state 906, if the serial debug port register write feedback signal is asserted to 1 and the processor core 104 is in the debug mode so that the Debug Mode TCK signal is asserted, then the debug port state machine 206 transitions to the Debug Active state 902. The asserted serial debug port register write feedback signal indicates that the clock signal for the register writes was generated. If the serial debug port register write feedback signal is asserted to 1 and the processor core 104 is not in the debug mode (the Debug Mode TCK signal is deasserted to 0), then the debug port state machine 206 transitions to the JTAG Debug mode state 901 and the finished flag (F) retains the previous value.

Figure 10:
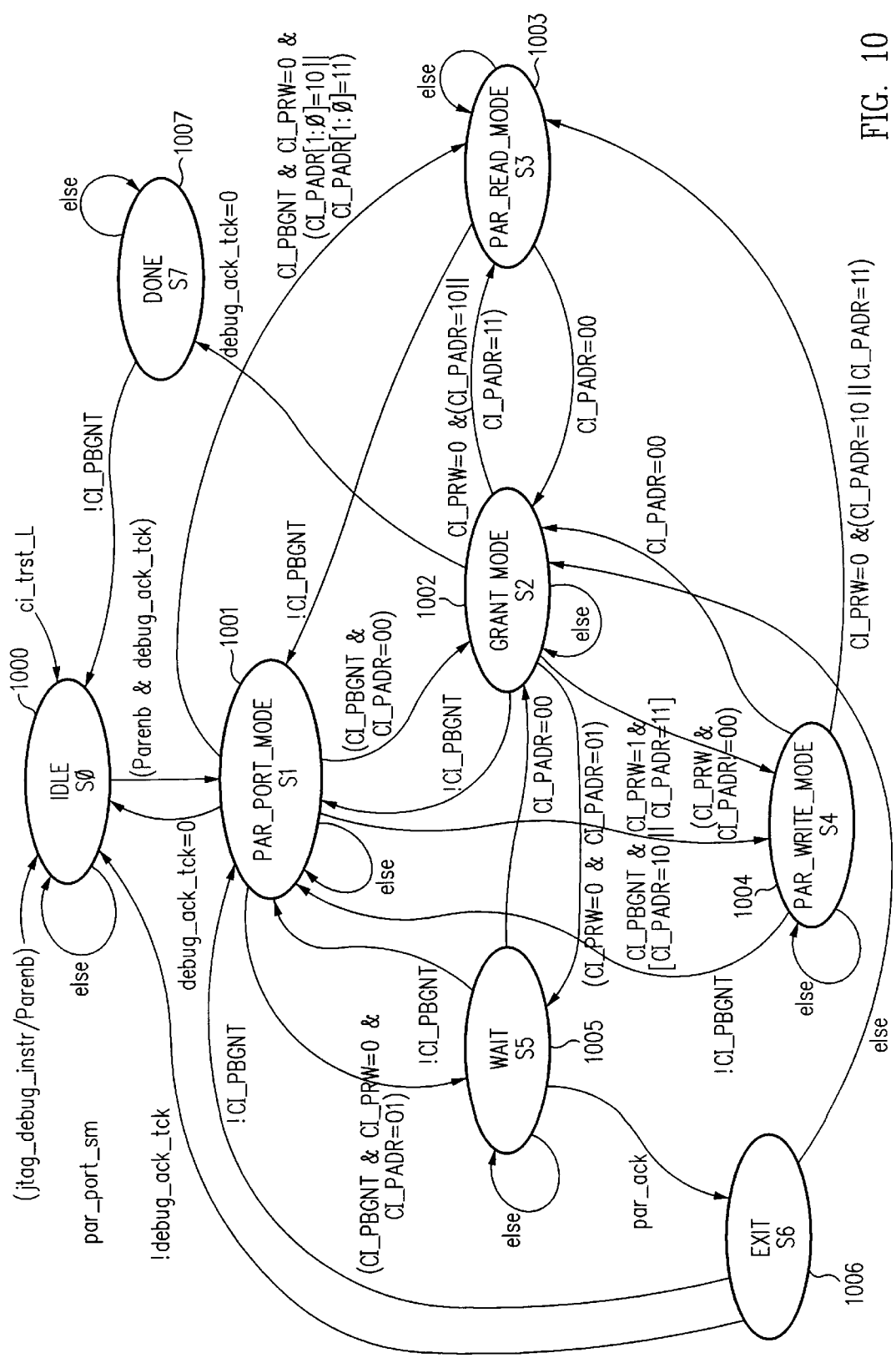
FIG. 10 is a schematic state diagram depicting operating states of the parallel port state machine shown in FIG. 2.

Referring to FIG. 10, a schematic state diagram depicts operating states of the parallel port state machine 226. The parallel port state machine 226 reads data and commands from the parallel port 214 and establishes a request-grant handshake between the host system 111 and the target system 101. The parallel port state machine 226 communicates with the debug port state machine 206 when the command is read from the parallel port 214, as is indicated by a Parallel update signal that is asserted to 1. The debug port state machine 206 asserts the parallel port acknowledge signal to 1 when the CPU command or serial trace read command is completed. The parallel port state machine 226 also generates pad control signals from the parallel port lines CI_PDATA[15:0] and CI_PADR[2:0]. The parallel port state machine 226 generates a command acknowledge CO_CMDACK signal.

The parallel port state machine 226 enables pads CI_PDATA[15:0], CI_PADR[2:0], and CI_PRW for generating output signals when a breakpoint request CO_PBREQ signal is deasserted to 0 and the command acknowledge CO_CMDACK signal is asserted to 1. Trace data[19:0] is transmitted on the 20-bit bus formed by the CI_PDATA[15:0] and CI_PADR[2:0], and CI_PRW signals. When the parallel port 214 is enabled the CI_PDATA[15:0] is used for sending output signals when CI_PRW=1. When CI_PRW=0, the 20-bit bus it is used as an input bus.

The parallel port state machine 226 transitions to an Idle state (state=0) 1000 under several conditions. The parallel port state machine 226 enters the Idle state 1000 when a JTAG Test Reset signal is asserted to 1, when the parallel port enable (PARENB) signal is 0 in the Debug Registers 210, or when the JTAG debug instruction state variable is 0. In the Idle state 1000, an output signal tri_pdata that is used for pad control of the parallel lines CI_PDATA[15:0] is deasserted to 0 so that the port CI_PDATA[15:0] is enabled as input to the parallel port 214. The parallel port state machine 226 operates using several state variables. For example, an output signal sel_d t_leo is used as a multiplexer select between usage of the parallel port 214 as the data bus and as the trace bus. A command acknowledge signal cmdack_out indicates that a parallel port command is complete. A CO_CMDACK signal designates a logical-OR condition of the command acknowledge output signal cmdack_out and the finished flag (F). A signal low_data_up is used for latching the lower sixteen bits of data on the parallel port 214. A signal up_data_up is used for latching the upper sixteen bits of data on the parallel port 214. A parallel port read select signal par_read_sel is used to select an upper or lower word when the processor core 104 reads data using the parallel port 214. In the Idle state 1000, the output signal sel_d_t_leo is deasserted to 0, the CO_PBREQ is deasserted to 0, the low_data_up signal and the up_data_up signal are deasserted to 0, and the par_read_sel signal is deasserted to 0.

In the Idle state 1000, if the parallel port enable (PARENB) signal is asserted to 1 and the debug acknowledgment TCK signal is asserted to 1, then the parallel port state machine 226 transitions to a parallel port mode state (state=1) 1001. Command acknowledge and parallel bus request output signals CO_CMDACK and CO_PBREQ are asserted to 1. Parallel bus read select, upper order data select, and lower order data select output signals, respectively, par_read_sel, up_data_up, and low_data_up are deasserted to 0. Up_data_up and low_data_up signals from the previous cycle are latched and used to generate a pulse that is used to latch the upper or lower 16-bits of parallel port data into ldata_in[15:0] and udata_in[15:0] registers.

In the parallel port mode state 1001, the parallel port state machine 226 waits for the host system 111 to write data and commands, or read data from the target system 101. If the host system 111 asserts a parallel bus grant signal (CI_PBGNT=1) and the parallel address bits are deasserted (CI_PADR=2'b00), the parallel port state machine 226 transitions to a Grant Mode state (state=2) 1002 and asserts the command acknowledge and parallel bus request output signals CO_CMDACK and CO_PBREQ to 1.

Also in the parallel port mode state 1001, if the host system 111 asserts the parallel bus grant signal (CI_

PBGNT=1) but deasserts the parallel read/write signal (CI_PRW=0), and the parallel address bits are set to CI_PADR=2'b01, then the parallel port state machine 226 transitions to a Wait State (state=5) 1005 and asserts the parallel bus request (CO_PBREQ=1) indicating that the host system 111 has completed writing the command.

Also in the parallel port mode state 1001, if the host system 111 asserts the parallel bus grant signal (CI_PBGNT=1) but deasserts the parallel read/write signal (CI_PRW=0), and the parallel address bits CI_PADR are set to either 2'b10 or 2'b11, then the parallel port state machine 226 transitions to a parallel read mode state (state=3) 1003 and asserts the command acknowledge and the parallel bus request (CO_CMDACK=1 and CO_PBREQ=1). In the transition to the parallel read mode state 1003, if the parallel address bits CI_PADR are 2'b10, the parallel port state machine 226 asserts the upper order 16-bit data transfer signal (up_data_up=1). If the parallel address bits CI_PADR are 2'b11, the parallel port state machine 226 asserts the lower order 16-bit data transfer signal (low_data_up=1).

Also in the parallel port mode state 1001, if the host system 111 asserts the parallel bus grant signal and the parallel read/write signal (CI_PBGNT=1 and CI_PRW=1), and the parallel address bits CI_PADR are set to either 2'b10 or 2'b11, then the parallel port state machine 226 transitions to a parallel write mode state (state=4) 1004 and asserts the command acknowledge and the parallel bus request (CO_CMDACK=1 and CO_PBREQ=1). In the transition to the parallel write mode state 1004, if the parallel address bits CI_PADR are 2'b10, the parallel port state machine 226 asserts the parallel read select (par_read_sel=1) indicating to multiplex the high-order 16-bits of data to the host system 111 on PDATA[15:0] bus. If the parallel address bits CI_PADR are 2'b11, the parallel port state machine 226 deasserts the parallel read select (par_read_sel=0) indicating to multiplex the low-order 16-bits of data to the host system 111 on PDATA[15:0] bus.

Also in the parallel port mode state 1001, if the debug acknowledgment TCK signal is deasserted to 0 indicating that the CPU is not in the debug mode, the parallel port state machine 226 transitions to the Idle state 1000, deasserting the command acknowledge and parallel bus request output signals CO_CMDACK and CO_PBREQ to 0, and deasserting the parallel read select, upper order data, and lower order data signals par_read_sel=0, up_data_up=0, and low_data_up=0, respectively.

In the Grant Mode state 1002, if the host system 111 deasserts the parallel bus grant signal CI_PBGNT=0, then the parallel port state machine 226 transitions to the parallel port mode state 1001 and asserts the command acknowledge and parallel bus request output signals CO_CMDACK and CO_PBREQ to 1. Also in the Grant Mode state 1002, if the debug acknowledgment TCK signal is deasserted to 0, the parallel port state machine 226 transitions to a DONE state (state=7) 1007 and deasserts the command acknowledge and parallel bus request output signals CO_CMDACK and CO_PBREQ to 0, as well as deasserting the parallel read select, upper order data, and lower order data signals, respectively, par_read_sel, up_data_up, low_data_up, to 0.

Also in Grant_mode state 1002, if the parallel port read/write select signal CI_PRW is deasserted to 0 and the parallel port address CI_PADR selects 2'b01, then the parallel port state machine 226 transitions to a Wait state (state=5) 1005 and the parallel bus request CO_PBREQ is asserted to 1 and CO_CMDACK is set to 0. Otherwise in the Grant Mode state 1002, if the parallel port read/write select signal CI_PRW is deasserted to 0 and the parallel port address CI_PADR selects either 2'b10 or 2'b11, then the parallel port state machine 226 transitions to the parallel read mode state (state=3) 1003. In the transition to the parallel read mode state (state=3) 1003, the parallel port state machine 226 asserts the command acknowledge and parallel bus request output signals CO_CMDACK and CO_PBREQ to 1. If the parallel address bits CI_PADR are 2'b10, the parallel port state machine 226 asserts the upper order 16-bit data transfer signal (up_data_up=1). If the parallel address bits CI_PADR are 2'b11, the parallel port state machine 226 asserts the lower order 16-bit data transfer signal (low_data_up=1).

Also in Grant Mode state 1002, if the parallel read write select CI_PRW is asserted to 1 and the parallel port address CI_PADR is not equal to 2'b00, then the parallel port state machine 226 transitions to the parallel write mode state 1004 and asserts the command acknowledge and parallel bus request output signals CO_CMDACK and CO_PBREQ to 1. In the transition to the parallel write mode state 1004, if the parallel address bits CI_PADR are 2'b10, the parallel port state machine 226 asserts the parallel read select (par_read_sel=1) indicating to multiplex the high-order 16-bits of data to the host system 111 on PDATA[15:0] bus. If the parallel address bits CI_PADR are 2'b11, the parallel port state machine 226 deasserts the parallel read select (par_read_sel=0) indicating to multiplex the low-order 16-bits of data to the host system 111 on PDATA[15:0] bus.

In the parallel read mode state 1003, if the host system 111 deasserts the parallel bus grant signal CI_PBGNT to 0, then the parallel port state machine 226 transitions to the parallel port mode state 1001 and asserts the command acknowledge and parallel bus request output signals CO_CMDACK and CO_PBREQ to 1. Otherwise in the parallel read mode state 1003, if the host system 111 sets the parallel port address to 2'b00, then the parallel port state machine 226 transitions to the Grant Mode state 1002 and asserts the command acknowledge and parallel bus request output signals CO_CMDACK and CO_PBREQ to 1. Otherwise in the parallel read mode state 1003, if the host system 111 sets the parallel port address to 2'b01, then the parallel port state machine 226 transitions to the Wait state 1005 and asserts the parallel bus request output signal CO_PBREQ to 1.

In the parallel write mode state 1004, if the host system 111 deasserts the parallel bus grant signal CI_PBGNT to 0, then the parallel port state machine 226 transitions to the parallel port mode state 1001 and asserts the command acknowledge and parallel bus request output signals CO_CMDACK and CO_PBREQ to 1. Otherwise in the parallel write mode state 1004, if the host system 111 sets the parallel port address to 2'b00, then the parallel port state machine 226 transitions to the Grant Mode state 1002 and asserts the command acknowledge and parallel bus request output signals CO_CMDACK and CO_PBREQ to 1. Otherwise in the parallel write mode state 1004, if the host system 111 deasserts the parallel read write select CI_PRW to 0 and sets the parallel port address to either 2'b10 or 2'b11, then the parallel port state machine 226 transitions to the parallel read mode state 1003 and asserts the command acknowledge and parallel bus request output signals CO_CMDACK and CO_PBREQ to 1. If the parallel address bits CI_PADR are 2'b10, the parallel port state machine 226 asserts the upper order 16-bit data transfer signal (up_data_up=1). If the parallel address bits CI_PADR are 2'b11, the parallel port state machine 226 asserts the lower order 16-bit data transfer signal (low_data_up=1).

In the Wait state 1005, if the host system 111 deasserts the parallel bus grant signal CI_PBGNT to 0, then the parallel port state machine 226 transitions to the parallel port mode state 1001 and asserts the command acknowledge and parallel bus request output signals CO_CMDACK and CO_PBREQ to 1. Otherwise in the Wait state 1005, if the host system 111 sets the parallel port address CI_PADR to 2'b00, then the parallel port state machine 226 transitions to the Grant Mode state 1002 and asserts the command acknowledge and parallel bus request output signals CO_CMDACK and CO_PBREQ to 1. Otherwise in the Wait state 1005, if the parallel port acknowledge signal is 1, then the parallel port state machine 226 transitions to an Exit state (state=6) 1006 and asserts the command acknowledge and parallel bus request output signals CO_CMDACK and CO_PBREQ to 1.

In the Exit state 1006, if the debug acknowledgment TCK signal is equal to 0, then the parallel port state machine 226 transitions to the Idle state 1000 and deasserts the command acknowledge and parallel bus request output signals CO_CMDACK and CO_PBREQ to 0. Also in the transition to the Idle state 1000, the parallel port state machine 226 deasserts the parallel read select, upper order data, and lower order data signals, respectively par_read_sel, up_data_up, and low_data_up, to 0. Also in the Exit state 1006, if the host system 111 deasserts the parallel bus grant signal CI_PBGNT to 0, then the parallel port state machine 226 transitions to the parallel port mode state 1001 and asserts the command acknowledge and parallel bus request output signals CO_CMDACK and CO_PBREQ to 1. Otherwise in the Exit state 1006, if the host system 111 asserts the parallel bus grant signal CI_PBGNT to 1 and if debug acknowledgment TCK signal is asserted to 1, the parallel port state machine 226 transitions to the Grant Mode state 1002 and asserts the command acknowledge and parallel bus request output signals CO_CMDACK and CO_PBREQ to 1.

In the Done state 1007, the parallel port state machine 226 waits for a deasserted parallel bus grant signal CI_PBGNT from the host system 111. When the host system 111 deasserts the parallel bus grant signal CI_PBGNT to 0, the parallel port state machine 226 transitions to the Idle state 1000 and deasserts the command acknowledge and parallel bus request output signals CO_CMDACK and CO_PBREQ to 0, as well as deasserting the parallel read select, upper order data, and lower order data signals, respectively par_read_sel, up_data_up, and low_data_up, to 0.

Figure 11:
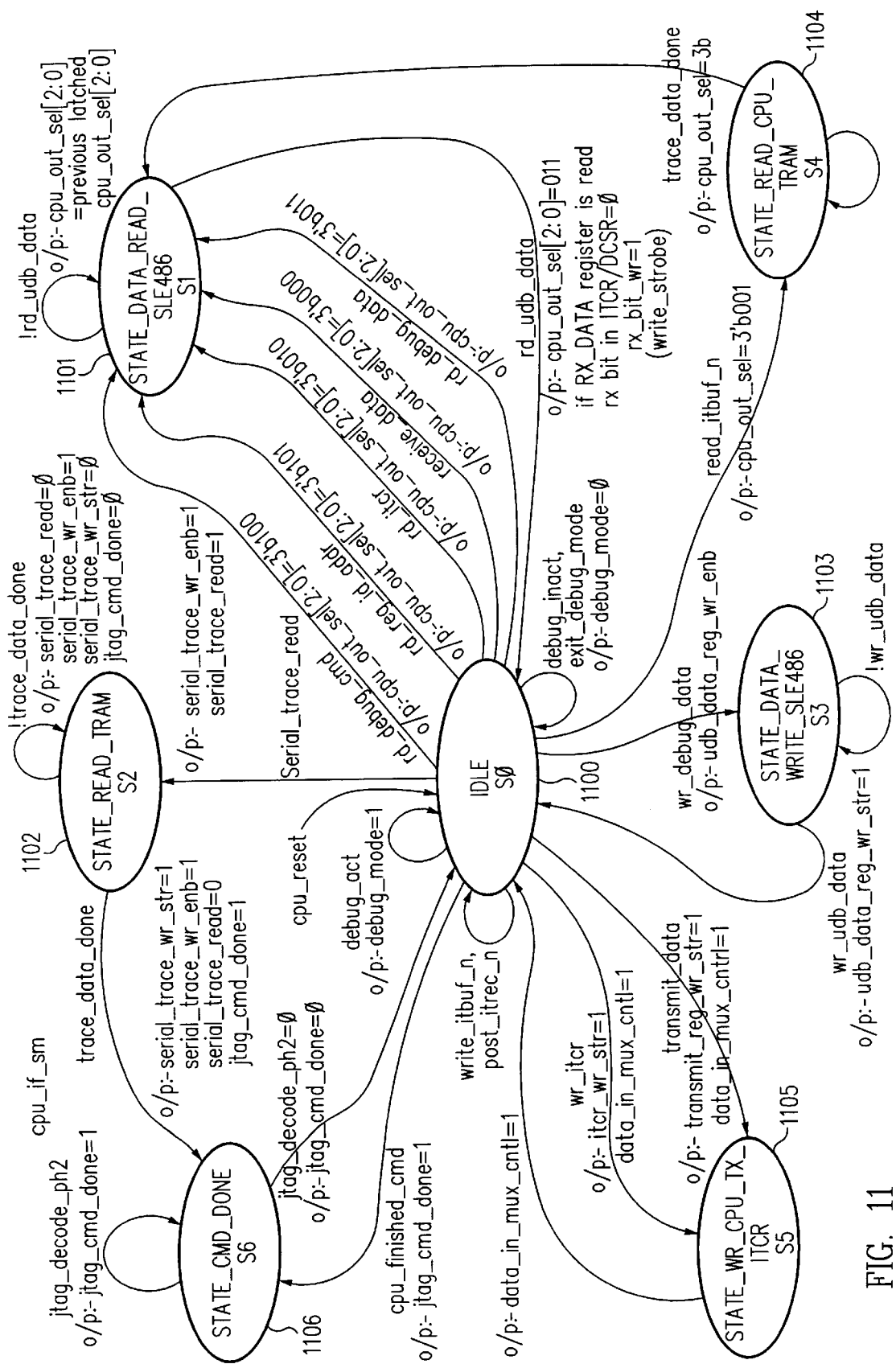
FIG. 11 is a schematic state diagram depicting operating states of the processor interface state machine shown in FIG. 2.

Referring to FIG. 11, a schematic state diagram depicts operating states of the processor interface state machine 202. The processor interface state machine 202 interfaces to the processor core 104 and operates at the same frequency as the processor core 104. The processor interface state machine 202 also interfaces to the trace control circuit 218 and performs several functions. For example, the processor interface state machine 202 take appropriate actions for commands that are decoded by the command decode and processing block 208. The processor interface state machine 202 generates multiplexer control signals for multiplexing data for read operations of the processor core 104 including selection of read operations directed to the RX_DATA[31:0] register, the trace_record[20:0], the ITCR[31:0] register, the soft_address[31:0] register, the command[3:0] including upper-order data udata_in[15:0] and lower-order data ldata_in[15:0].

The processor interface state machine 202 generates write strobe signals for writing the data from the processor core 104 to the ITCR[31:0] register, the TX_DATA[31:0] register, and the read_data[31:0] register. Data from the read_data register is read by the host system 111. For example, if the host system 111 requests a read operation from an EAX register in the processor core 104, data from the processor core 104 is placed in the read_data register that is eventually read by the host system 111. If the host system 111 reads the data using the JTAG TAP controller 204 and the JTAG TAP controller state machine is in capture-DR state (see FIG. 3), data from the read_data register is transferred to a shifter[37:6] register in the serial debug shifter 227. If the host system 111 uses the parallel port 214, data from the read_data register is placed onto the PDATA[15:0] bus.

The processor interface state machine 202 indicates to the trace control circuit 218 information regarding a serial trace read from a designated address in the soft address register. When the trace control circuit 218 completes reading of the trace data, the processor interface state machine 202 generates a command finished signal (cmd_done) to the debug port state machine 206 and generates a write strobe signal for read_data register.

The processor interface state machine 202 enters an Idle State (state=0) 1100 following a CPU_reset signal from the processor core 104. The command decode and processing block 208 decodes CPU commands and sends appropriate signals to the processor interface state machine 202. In the Idle State 1100, if the processor core 104 writes a DEBUG ACTIVATE command the processor interface state machine 202 remains in the Idle State 1100 and asserts the Debug Mode TCK output signal to 1, indicating that the processor core 104 is in debug mode. The Debug Mode TCK signal is used by the debug port state machine 206 to generate an acknowledgment signal.

In the Idle State 1100, if the processor core 104 writes a DEBUG INACTIVATE command the processor interface state machine 202 remains in the Idle State 1100 and deasserts the Debug Mode TCK output signal to 0, indicating that the processor core 104 has exited debug mode.

In the Idle State 1100, if the processor core 104 writes the READ ITCR REGISTER command the processor interface state machine 202 transitions to a Data Read Processor State (state=1) 1101 and sets a processor output select cpu_out_sel[2:0] output signal to 3'b010. The processor output select control the multiplexer for sending data to the processor core 104.

In the Idle State 1100, if the processor core 104 sends the WRITE ITCR REGISTER command the processor interface state machine 202 transitions to a Write Processor TX ITCR Register state (state=5) 1105 and asserts an ICTR register write signal itcr_wr_str to 1 and asserts a multiplexer control signal data_in_mux_cntl to 1. The ITCR register write signal itcr_wr_str is used to write the CPU data to the ITCR register. The multiplexer control signal data_in_mux_cntl is used to control a 2:1 multiplexer 1534 which is used for multiplexing processor data and serial port data.

In the Idle State 1100, if the processor core 104 writes a READ DEBUG DATA command the processor interface state machine 202 transitions to the Data Read Processor State 1101 and sets the processor output select cpu_out_sel[2:0] signal to 3'b011. The processor output select cpu_out_sel value of 3'b011 multiplexes upper order and low order data, respectively udata_in[15:0] and ldata_in[15:0], to the processor core 104.

In the Idle State 1100, if the processor core 104 writes the READ DEBUG COMMAND the processor interface state machine 202 transitions to the Data Read Processor State

1101 and sets the processor output select cpu_out_sel[2:0] signal to 3'b100. The processor output select cpu_out_sel value of 3'b100 multiplexes command cmd[3:0] register data to the processor core 104.

In the Idle State 1100, if the processor core 104 writes a WRITE DEBUG DATA command the processor interface state machine 202 transitions to the Data Write Processor State (state=3) 1103 and asserts a multiplexer select udb_data_reg_wr_enb signal to 1, controlling a multiplexer 1530 to select the processor data for writing to the read_reg[31:0] register.

When the processor interface state machine 202 is in the Idle State 1100 and the processor core 104 writes a READ SOFT ADDRESS REGISTER command, the processor interface state machine 202 transitions to the Data Read Processor State 1101 and sets the processor output select cpu_out_sel[2:0] signal to 3'b101, multiplexing the soft_addr[31:0] register data to the processor core 104.

When the processor interface state machine 202 is in the Idle State 1100 and the processor core 104 writes a WRITE ITBUF N command or a POST ITBUF N command, the processor interface state machine 202 remains in the Idle State 1100. The trace control circuit 218 logic also reads the commands from the processor core 104 and appropriately decodes the commands and performs the requested operations.

In the Idle State 1100, if the processor core 104 writes a READ ITBUF N command the processor interface state machine 202 transitions to a Read Processor Trace State (state=4) 1104. The processor output select signal cpu_out_sel signal is set to 3'b001 to select trace record data.

When the processor interface state machine 202 is in the Idle State 1100 and the processor core 104 writes a command to read the receive data, the processor interface state machine 202 transitions to the Data Read Processor State 1101 and sets the processor output select cpu_out_sel[2:0] to 3'b000, thereby selecting the receive data register data.

When the processor interface state machine 202 is in the Idle State 1100 and the processor core 104 writes a command to write data to the transmit data register, the processor interface state machine 202 transitions to the Write Processor TX ITCR Register state 1105 and asserts a write transmit register transmit_reg_wr_str signal and a multiplex data data_in_mux_cntl signal to 1. The write transmit register signal transmit_reg_wr_str is used to write to the transmit register and also to set the TX bit in the ITCR register. The multiplex data signal data_in_mux_cntl is used to multiplex 1534 the data from the processor core 104.

When the processor interface state machine 202 is in the Idle State 1100 and the processor core 104 writes a command indicating that the serial/parallel port command is completed, the processor interface state machine 202 transitions to a Command Complete State 1106 and asserting the JTAG command done signal jtag_cmd_done to 1. The JTAG command done signal is used by the debug port state machine 206 to acknowledge command completion to the Host and accept new commands.

When the processor interface state machine 202 is in the Idle State 1100 and if a processor reset signal cpu_reset or a processor soft reset signal cpu_sreset occur, or the freset bit in the DCSR register is asserted, then the processor interface state machine 202 remains in the Idle State 1100, retaining the Debug Mode TCK output signal at a value of 0 to indicate that the processor core 104 is not in the debug mode.

When the processor interface state machine 202 is in the Idle State 1100 and the host system 111 writes a SERIAL TRACE READ command, the processor interface state machine 202 transitions to a Read Trace State 1102 and asserts a serial trace write enable serial_trace_wr_enb signal and a serial trace read serial_trace_read signal to 1. The serial trace write enable signal serial_trace_wr_enb is used to select, using multiplexer control, 1530 the trace record for writing to the read_data register. The host system 111 reads the trace data from the read_data register. The serial trace read signal serial_trace_read is sent to the trace control circuit 218 logic indicating for the trace control circuit 218 to read the trace data from the address in the soft_address register.

In the Data Write Processor State 1103, the processor interface state machine 202 is waits for a write debug wr_udb_data signal from the processor core 104 which indicates that the processor core 104 writes the data. When the processor core 104 asserts the write debug wr_udb_data signal to 1, the processor interface state machine 202 transitions to the Idle State 1100. A write data signal udb_data_reg_wr_str is asserted to 1 and a multiplexer 1530 select signal udb_data_reg_wr_enb is set to remain at the previous latched value. The write data signal udb_data_reg_wr_str is used to write data to the read_data register. The multiplexer select signal udb_data_reg_wr_enb is used to multiplex 1530 select data from the processor core 104.

In the Data Read Processor State 1101, the processor interface state machine 202 waits for a read data signal rd_udb_data from the processor core 104. The read data signal rd_udb_data indicates that the processor core 104 is reading the data. When the processor core 104 asserts the read data signal rd_udb_data to 1, the processor interface state machine 202 transitions to the Idle State 1100, setting the processor output select signal cpu_out_sel to 3'b011. If the previous latched value of the processor output select signal cpu_out_sel is equal to 3'b000, indicating that the processor core 104 requests a data read from the receive data register, then an RX bit clear output signal rx_bit_wr is asserted to 1, clearing the RX bit in the ITCR/DCSR registers.

In Read Trace State 1102, the processor interface state machine 202 waits for a trace_data_done indication from the trace control circuit 218. When trace control circuit 218 asserts trace_data_done indication to 1, the processor interface state machine 202 transitions to the Command Complete State 1106. In the transition to the Command Complete State 1106 asserts serial trace write and enable read signals, respectively serial_trace_wr_str and serial_trace_wr_enb to 1, deasserts a serial trace read signal serial_trace_read to 0, and asserts the JTAG command complete jtag_cmd_done signal to 1. The serial trace write signal serial_trace_wr_str is used to write the trace data to the read_data register. The serial trace enable signal serial_trace_wr_enb is used to multiplex 1530 select the trace data. The serial trace read signal serial_trace_read deasserted to 0 is used to indicate to the trace control circuit 218 that the serial trace is complete. The JTAG command complete signal jtag_cmd_done indicates to the debug port state machine 206 that the command is complete.

In the Read Processor Trace State 1104, the processor interface state machine 202 waits for the trace_data_done indication from the trace control circuit 218, indicating that the data requested by the processor core 104 has been read from the trace buffer 200. When trace_data_done is set, the processor interface state machine 202 transitions to the Data Read Processor State 1101 and the processor output select signal cpu_out_sel[2:0] is set to 3'b001, multiplex selecting the trace data for processor core data read.

In the Write Processor TX ITCR Register state 1105, the processor interface state machine 202 transitions to the Idle State 1100 in the next clock cycle with a data multiplex select output signal data_in_mux_cntl asserted to 1, indicating for a multiplexer 1534 to select the processor core data for debug register write operations.

In the Command Complete State 1106, the processor interface state machine 202 waits for a JTAG decode signal jtag_decode_ph2 to be asserted to 0, an indication from the debug port state machine 206 that the CPU command has been completed and the processor core 104 is ready to accept new commands from the host system 111. When the JTAG decode signal jtag_decode_ph2 is equal to 0, the processor interface state machine 202 transitions to the Idle State 1100 and deasserts the JTAG command output signal jtag_cmd_done to 0.

Synchronization Between Multiple Different Frequencies

Referring again to FIG. 2, the host system 111 writes data to the Debug Registers 210, including ITCR, DCSR, RX_DATA, TX_DATA, and soft_address registers, through the serial/parallel port 214. After the target system 101 reads the data and command for a write operation of a Debug Register 210, the debug port state machine 206 generates a serial debug port write TCK output signal (sdp_reg_write_tck). The debug port state machine 206 operates at a frequency of 25 MHz.

Figure 12:
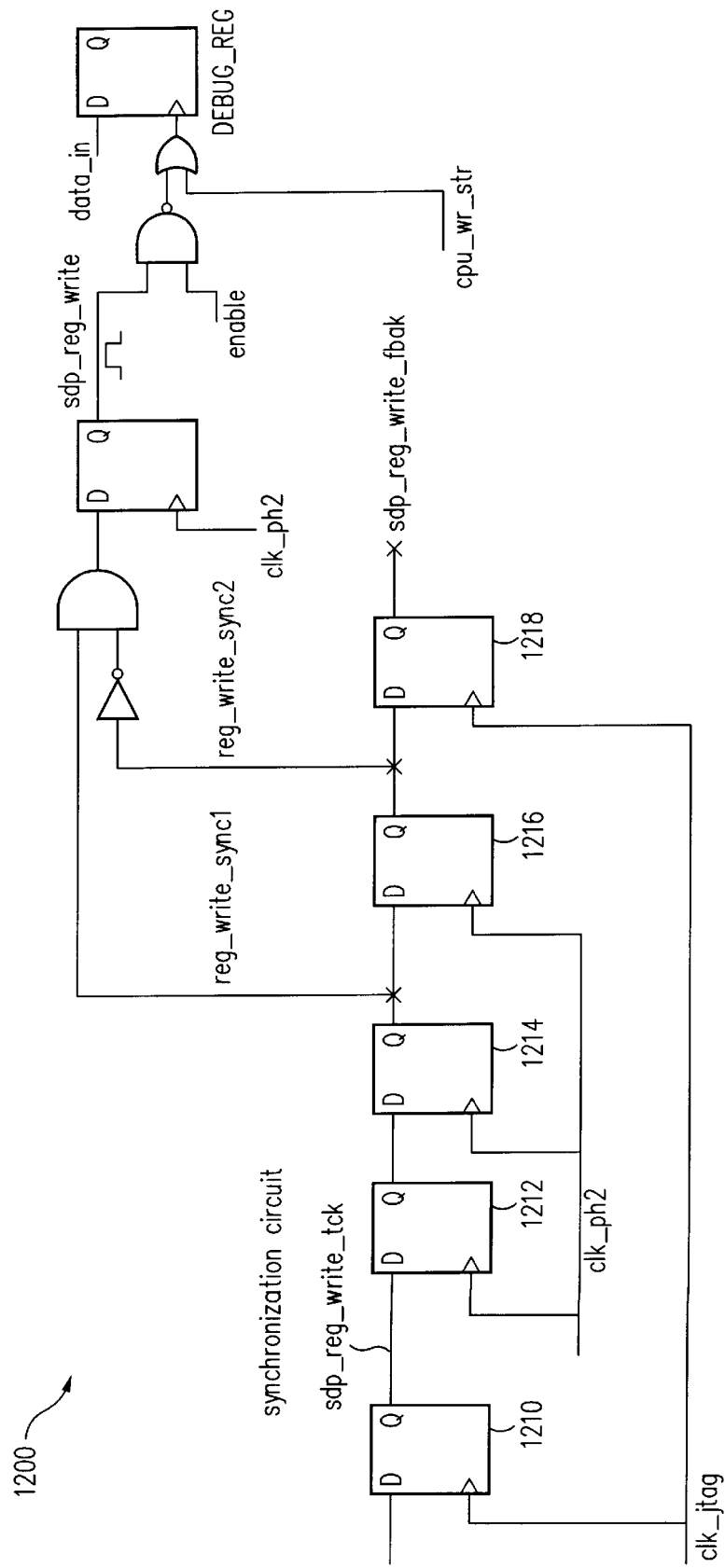
FIG. 12 is a schematic circuit diagram illustrating an embodiment of a synchronization circuit for communicating commands and data between a communication port which is operating at a specified lower frequency and a processor core and trace control circuit that are operating at multiple various frequencies that are higher than the specified lower frequency.

Referring to FIG. 12, a schematic circuit diagram illustrates an embodiment of a synchronization circuit 1200 for communicating commands and data between a communication port 214 which is operating at a specified lower frequency and a processor core 104 and trace control circuit 218 that are operating at multiple various frequencies that are higher than the specified lower frequency. The serial debug port register write TCK signal (sdp_reg_write_tck) is synchronized through the usage of one or more flip-flops which are clocked by the processor clock operating at frequencies such as 33 Mhz, 66 Mhz, 99 Mhz, or 133 Mhz. In the illustrative embodiment, three flip-flops 1210, 1212, and 1214 are included in the synchronization circuit 1200.

The rising edge of the serial debug port register write TCK signal (sdp_reg_write_tck) is detected by a first flip-flop 1210 and is synchronized through a second flip-flop 1212 and a third flip-flop 1214 that are clocked by the processor clock (clk_ph2). The output of the third flip-flop 1214 is qualified with a register enable signal generated by the command decode and processing block 208. The register enable signal is a gated signal used to clock the data to the registers of the Debug Registers 210. A reg_write_sync2 generated by the flip-flop 1216 is synchronized using a flip-flop 1218 clocked by a clock jtag signal (clk_jtag) and the output clocked signal is sent to the debug port state machine 206. The serial debug port feedback signal (sdp_reg_write_fbak) indicates to the debug port state machine 206 that the data has been written to the Debug Registers 210. The debug port state machine 206 in response indicates to the host system 111 the debug register write command completion status.

Figure 13:
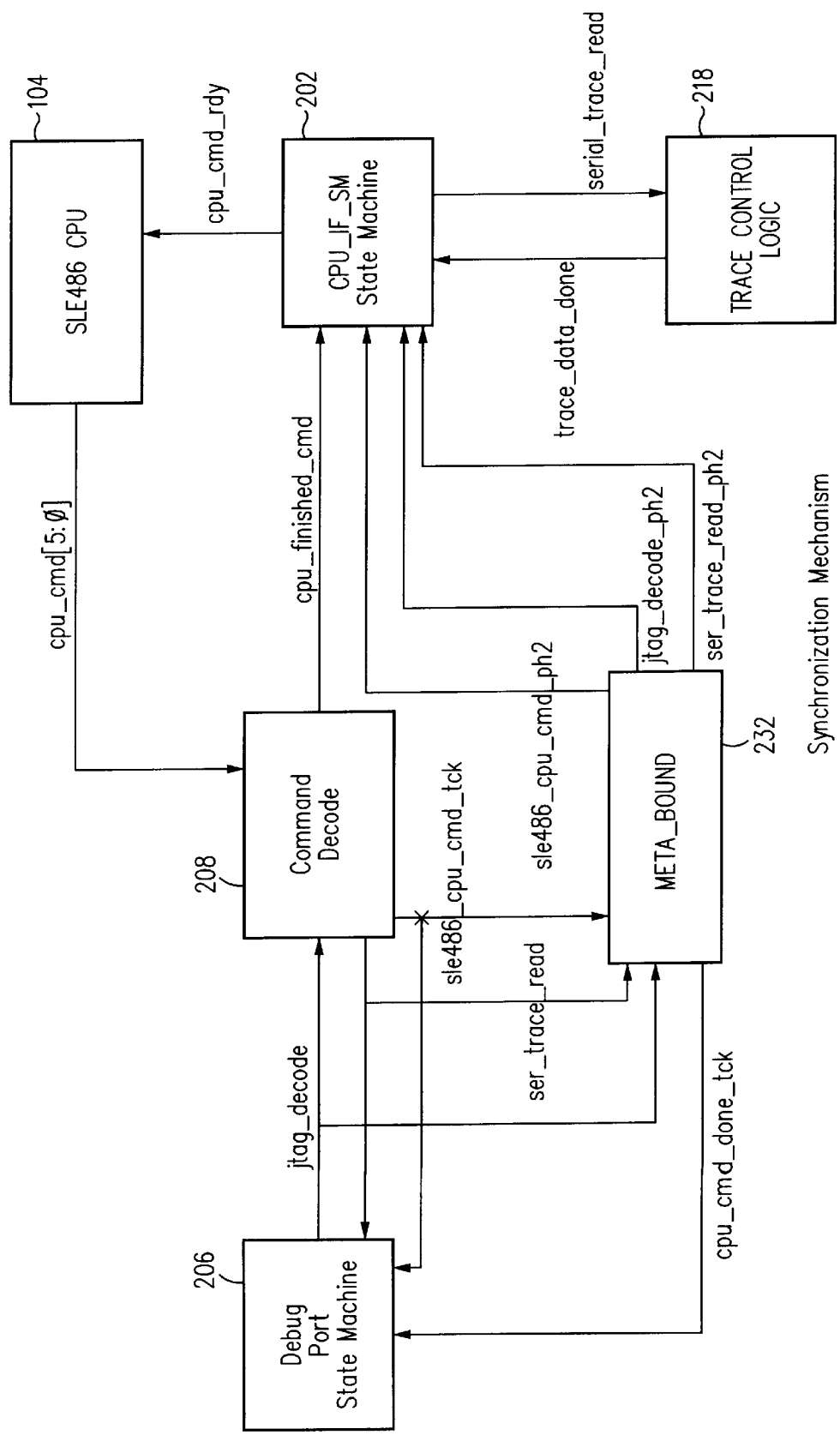
FIG. 13 is a schematic block diagram illustrating synchronization elements of the embedded processor device.
Figure 14:
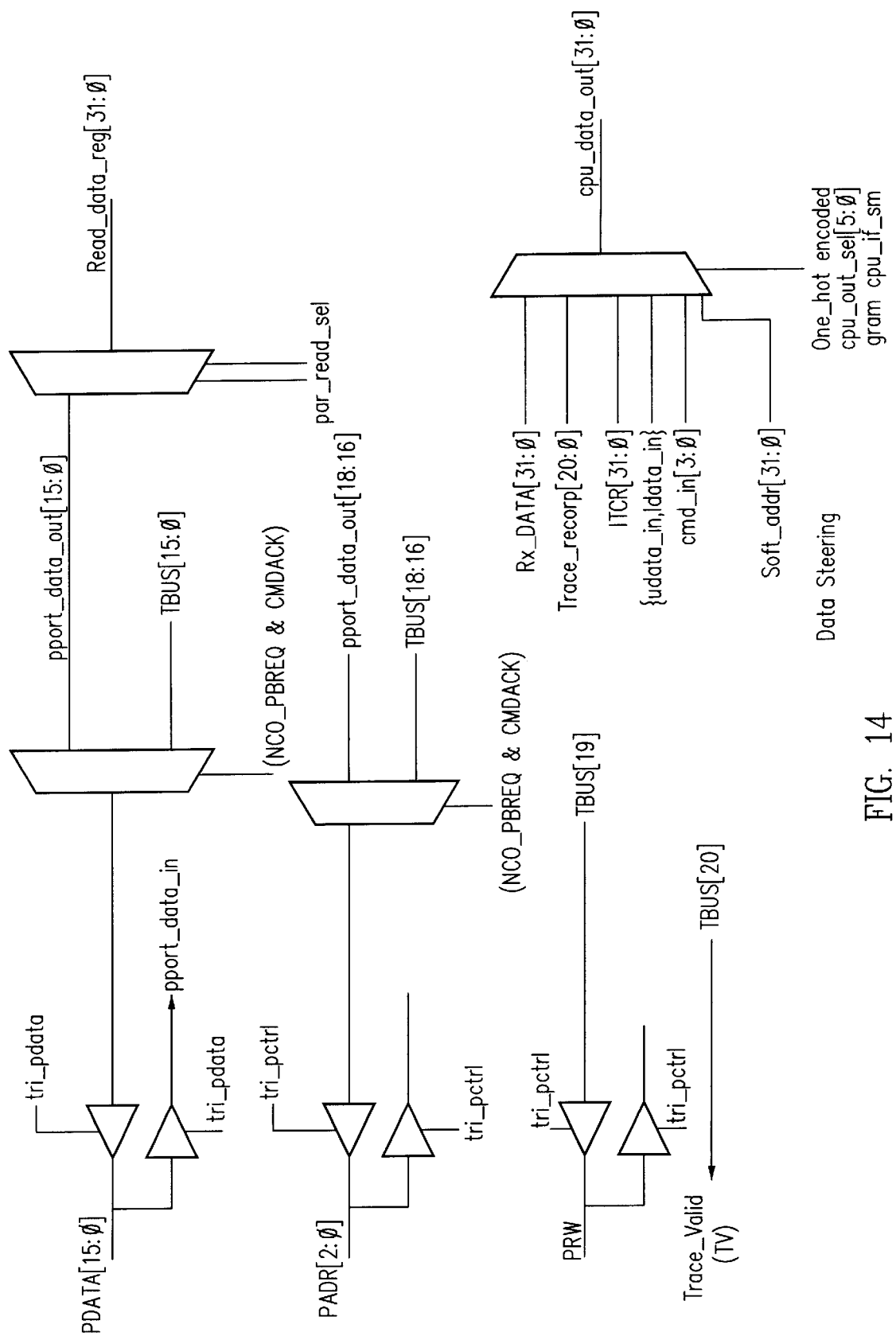
FIG. 14 is a schematic circuit diagram illustrating a data steering circuit in the software debug port.
Figure 15:
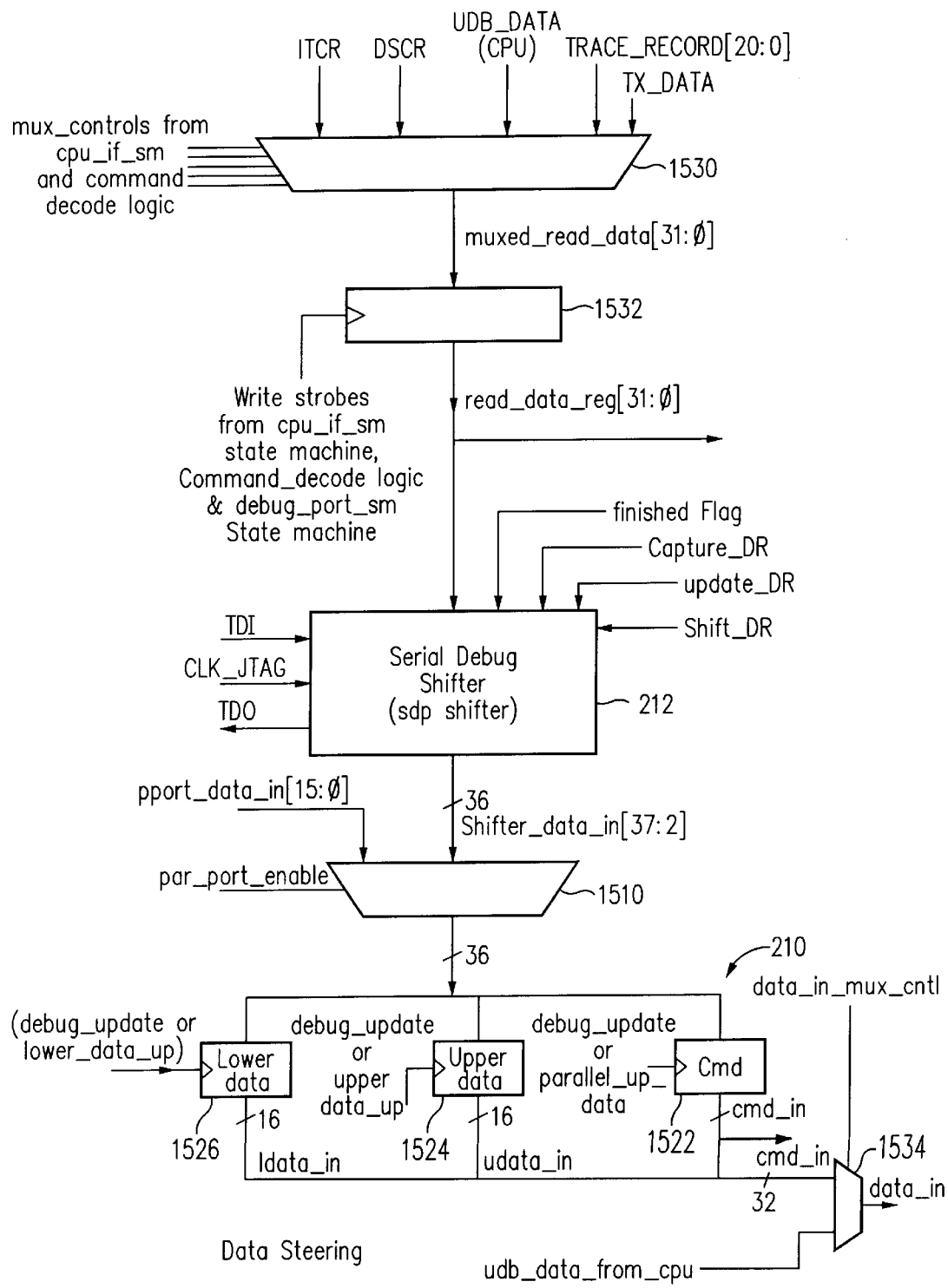
FIG. 15 is a schematic block diagram illustrating the utilization of data steering signals in the software debug port.

Referring to FIG. 13 in combination with FIG. 12, a schematic block diagram illustrates synchronization elements of the embedded processor device 102 shown in FIGS. 1 and 2. Commands from the serial/parallel port 214 are decoded by the command decode and processing block 208. After the command is read from the host system 111, the debug port state machine 206 generates the JTAG decode (jtag_decode) output signal that is used by the command decode and processing block 208 to decode the command in the command register. If the decoded command from the host system 111 employs intervention of the processor core 104, the command decode and processing block 208 generates a processor command TCK clock signal (sle486_cpu_cmd_tck signal). The processor command TCK clock signal (sle486_cpu_cmd_tck signal) is synchronized through multiple back to back flip-flops 1210,1212, and 1214, clocked by the processor clock, and the output processor command phase signal (sle486_cpu_cmd_ph2) is sent to the processor interface state machine 202. The processor interface state machine 202 responds by sending notification of the command to the processor core 104. The processor core 104 reads the command and responds with suitable and appropriate actions. After recognizing the CPU command, the debug port state machine 206 enters a wait state and waits for the processor core 104 to complete execution of the command. After the processor core 104 completes command execution, the processor core 104 writes a command indicating that the CPU command is completed. The command indicating completion is decoded by the command decode and processing block 208, which issues a processor command done (cpu_cmd_done) signal to the processor interface state machine 202 and to the debug port state machine 206. The processor command complete signal (cpu_cmd_done) is synchronized by multiple back-to-back flip-flops, for example flip-flops 1210, 1212, and 1214, clocked by the clock tag (clk_tag) and sent to the debug port state machine 206. The debug port state machine 206 indicates to the host system 111 that the command is completed and deasserts the JTAG decode signal (jtag_decode) to 0. The JTAG decode (jtag_decode) signal is synchronized by the multiple back-to-back flip-flops clocked by the processor clock. The processor interface state machine 202 waits for the JTAG DECODE (jtag_decode) signal from the debug port state machine 206 to go low (0) and transitions to an Idle state (the Not JTAG Debug State (state=0) 900 shown in FIG. 9).

A similar synchronization technique and apparatus is used to communicate with the trace control circuit 218.

Handshaking Between Serial-Trace-Processor

When the host system 111 completes writing a command, the debug port state machine 206 generates a JTAG DECODE (jtag_decode) signal output to the command decode and processing block 208. If the command is a CPU command the command decode and processing block 208 logic generates the processor command TCK clock signal (sle486_cpu_cmd_tck signal) which is synchronized in a synchronization logic block 232. The synchronized output processor command phase signal (sle486_cpu_cmd_ph2) is sent to the processor interface state machine 202 state machine. The debug port state machine 206 is in the wait state till the processor core 104 completes the execution of the command. A jump command pending (jmp_cmd_pending) signal and a jump command done (jmp_cmd_done) signal are generated by the processor core 104. An asserted jump command pending (jmp_cmd_pending) signal indicates that the processor core 104 is ready to accept new serial port/parallel port commands. An asserted jump command done (jmp_cmd_done) signal indicates that the processor core 104 has written a command to the serial port/parallel port 214 and is waiting for command completion. The processor interface state machine 202 generates and sends an output signal processor debug jump (sle486_debug_jmps) to the processor core 104. Processor debug jump (sle486_debug_jmps) indicates either that the command sent by the processor core 104 is complete or a new serial port command is available for the processor core 104. The processor core 104 interprets the signal based on the jump command done (jmp_cmd_done) or jump command pending (jmp_cmd_pending) signals.

When the synchronization logic block 232 generates the processor command phase signal (sle486_cpu_cmd_ph2), and when the CPU asserts the jmp_cmd_pending signal the processor interface state machine 202 asserts sle486_debug_jmps. The processor core 104 reads the command and completes execution of an appropriate task in one or a plurality of processor core 104 commands. When the command is completed, the processor core 104 writes a CMD_DONE command on a debug data bus (udb_data) and asserts a write command (wr_udb_cmd) signal. The processor core 104 also periodically asserts the jump command done (jmp_cmd_done) signal and samples sle486_debug_jmps until the processor debug jump (sle486_debug_jmps) signal is asserted. The command decode and processing block 208 logic decodes the command and generates a processor command finished (cpu_cmd_finished) output signal to the processor interface state machine 202. The processor interface state machine 202 transitions to a wait state and asserts the processor command finished (cpu_cmd_done) signal which is synchronized to a clock jtag (clk_jtag) signal in the synchronization logic block 232 and sent to the debug port state machine 206. The processor interface state machine 202 also asserts the processor debug jump (sle486_debug_jmps) signal. When CPU asserts the jmp_cmd_done indicating to the processor core 104 that the CMD_DONE command is completed. The debug port state machine 206 transitions to a state that accepts further commands from the host system 111 and generates a command completion status flag to the host system 111. The debug port state machine 206 deasserts the JTAG DECODE (jtag_decode) signal output. When the JTAG DECODE (jtag_decode) signal is equal to zero, the processor interface state machine 202 transitions to the Idle State 1100.

To read data from the serial port/parallel port 214, the processor core 104 asserts read data (rd_udb_data) signals and reads data from the processor data output (cpu_data_out) bus. The processor interface state machine 202 multiplexes the data requested by the processor core 104 by generating processor output select (cpu_out_sel[3:0]) multiplex controls.

To read trace data from the trace control circuit 218, the host system 111 writes a command through serial port/parallel port 214. The debug port state machine 206 asserts the JTAG DECODE (jtag_decode) signal and the command decode and processing block 208 logic decodes the command and generates a serial trace read (serial_trace_read) signal. The debug port state machine 206 waits until the trace control circuit 218 completes reading the trace data. The serial trace read (serial_trace_read) signal is synchronized to the processor core 104 clock in the synchronization logic block 232 and a serial trace read phase two (ser_trace_read_ph2) signal is sent to the processor interface state machine 202. The processor interface state machine 202 generates the serial trace read (serial_trace_read) signal to the trace control circuit 218 and transitions to a wait state for the trace control circuit 218 to complete reading the data. When the serial trace read (serial_trace_read) signal is asserted the trace control circuit 218 reads the data from the trace buffer 200 from an address designated by an instruction buffer address (ITBUF_ADDR) bus. The trace control circuit 218 completes reading the data, asserts a trace data finished (trace_data_done) output signal, and sends the trace information via a trace record (trace_record) bus. The processor interface state machine 202 transitions to another state and asserts the processor command finished (cpu_cmd_done) signal for the debug port state machine 206. The processor command finished (cpu_cmd_done) signal is synchronized to the clock jtag (clk_jtag) signal in the synchronization logic block 232 and the debug port state machine 206 deasserts JTAG DECODE (jtag_decode) signal and transitions to a state that accepts new commands from the host system 111. The debug port state machine 206 also sets command completion status flag for the host system 111.

Data Steering

When the parallel port 214 is enabled, PDATA[15:0], PADR[2:0], and PRW are used as bidirectional pins. Controls for the pins are generated in the parallel port state machine 226 based on the PARENB bit in the DCSR register and the CO_PBREQ output signal. When external tracing is enabled the bidirectional pins are used to generate output trace record signals.

The data and commands from the JTAG TAP controller 204 port, and the parallel port 214 are latched into the ldata_in[15:0], udata_in[15:0], and cmd_in[3:0] registers in the Debug Registers 210 block, shown in FIG. 2. The data and commands are multiplexed from the serial/parallel port 214 to the registers by a 2:1 multiplexer. Data and commands that originate from the JTAG TAP controller 204 port are written to the Debug Registers 210 when the JTAG TAP controller 204 is in the update-DR state. When the data originates from the parallel port 214, the parallel port state machine 226 generates write strobe signals to the registers.

After the command is written to a command input (cmd_in[3:0]) register the debug port state machine 206 transitions to the DECODE1 or DECODE2 state and generates the JTAG DECODE (jtag_decode) output signal. The command decode and processing block 208 uses the JTAG DECODE (jtag_decode) signal to decode the command in the command input (cmd_in) register. The command decode and processing block 208 also decodes processor commands and the processor interface state machine 202 generates a multiplex control signal (data_in_mux_cntl) to select data from either the serial/parallel port 214 or from the processor core 104. The multiplexed output data_in[31:0] is used to write to the debug registers (ITCR, DCSR, RX_DATA, TX_DATA, SOFT_ADDR) 210. The debug port state machine 206 generates a serial debug port write (sdp_reg_write) strobe for serial/parallel port data that is synchronized with the processor clock and qualified with the decoded signal to write to the registers. The processor interface state machine 202 generates the write strobe signals for writing the processor data to the Debug Registers 210 block.

The processor interface state machine 202 generates the multiplex select signals when the processor core 104 attempts to read the data from the serial port of the JTAG TAP controller 204.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A debug interface for interfacing a processor core to a debug device, the debug interface comprising:

a debug register;

a processor interface state machine coupled to the debug register and connectable to the processor core, the processor interface state machine including an access debug register state responsive to a command from the processor core to request access to the debug register; and a debug port state machine coupled to the debug register and the processor interface state machine, and connectable to the debug device, the debug port state machine including a write debug register state responsive to the request to access the debug register by writing the debug register.

2. A debug interface according to claim 1, further comprising:

a pending/finished state machine coupled to the processor interface state machine and the debug port state machine, the pending/finished state machine designating when a command is pending and when a command is finished executing.

3. A debug interface according to claim 1, further comprising:

a parallel port state machine coupled to the processor interface state machine and the debug port state machine, the parallel port state machine for reading data and commands from a parallel port and establishing a request-grant handshake between the debug device and the processor.

4. A debug interface according to claim 1, wherein the debug device is a host system.

5. A debug interface according to claim 1, wherein the processor interface state machine has a plurality of access debug register states including a read debug data state, a read debug command state, and a write debug data state.

6. A debug interface according to claim 1 further comprising:

a parallel port coupled to the debug port state machine and the processor interface state machine; and a parallel port state machine coupled to the parallel port coupled to the debug port state machine and connectable to the debug device, the parallel port state machine reading data and commands from the parallel port and controlling a request-grant handshake between the processor core and the debug device.

7. An integrated computer chip comprising:

the processor core; and the debug interface according to claim 1.

8. A debug interface for interfacing a processor to a debug device, the debug interface comprising:

a serial input/output port;

a trace logic coupled to the serial input/output port; and an interface logic coupled to the serial input/output port and coupled to the trace logic, the interface logic including a state machine for communicating commands and data among the serial input/output port, the trace logic, and the processor, the state machine starting and stopping a trace mode of operation upon receipt of commands from the external device so that the trace mode of operation is controlled without setting a break point or executing processor instructions that start and stop the trace mode;

a decoder coupled to the interface logic and wherein the state machine reads commands and data from the serial input/output port and the trace logic, and wherein the decoder decodes commands read from the serial input/output port and the trace logic; and wherein the state machine has a plurality of states including, a command state for receiving written commands from the debug device;

a decode state for passing the written commands to the decoder; and a wait state for waiting until a command communication is complete.

9. A debug interface according to claim 8, further comprising:

a parallel input/output port, coupled to the trace logic and coupled to the interface logic, the interface logic including a state machine for communicating commands among the parallel input/output port, the trace logic, and the processor.

10. A debug interface according to claim 8, wherein the state machine further comprises:

a first state machine coupled to the processor and a second state machine coupled to the debug device, the first and second state machines mutually generating handshake signals controlling a handshake communication between the processor and the debug device.

11. A debug interface according to claim 8 wherein the serial input/output port is a JTAG (Joint Test Action Group) standard port.

12. A debug interface according to claim 8, wherein the debug device is a host system.

13. A debug interface according to claim 8, wherein:

a command utilizes intervention from the processor and the interface logic sends the command to the processor for execution.

14. A debug interface according to claim 8, further comprising:

a parallel input/output port, coupled to the trace logic and coupled to the interface logic, the interface logic including a state machine for communicating commands among the parallel input/output port, the trace logic, and the processor; and wherein the state machine further reads commands and data from the parallel input/output port, and the decoder further decodes commands read from the parallel input/output port.

15. A debug interface according to claim 14, wherein:

a command utilizes intervention from the processor and the interface logic sends the command to the processor for execution.

16. An integrated computer chip comprising:

the processor; and the debug interface according to claim 8.

17. A debug interface for interfacing a processor core to a debug device, the debug interface comprising:

a debug register;

an input/output port coupled to the debug register and executing at an input/output port clock rate;

a trace logic coupled to the debug register and executing at a trace logic clock rate;

a processor interface state machine coupled to the debug register and connectable to the processor core, the processor interface state machine executing at a processor clock rate; and a debug port state machine coupled to the debug register and the processor interface state machine, and connectable to the debug device, the debug port state machine and the processor interface state machine generating timing signals to the debug register that are synchronized to the processor clock rate.

18. A debug interface according to claim 17 wherein the input/output port is a serial input/output port.

19. A debug interface according to claim 17 wherein the input/output port is a parallel input/output port.

20. A debug interface according to claim 17 wherein the input/output port is a JTAG (Joint Test Action Group) standard port.

21. A debug interface according to claim 17, wherein the debug device is a host system.

22. An integrated computer chip comprising:

the processor core; and the debug interface according to claim 17.

23. A debug interface for interfacing a processor core to a debug device, the debug interface comprising:

a debug register;

an input/output port coupled to the debug register and executing at an input/output port clock rate;

a trace logic coupled to the debug register and executing at a trace logic clock rate;

a processor interface state machine coupled to the debug register and connectable to the processor core, the processor interface state machine executing at a processor clock rate; and a debug port state machine coupled to the debug register and the processor interface state machine, and connectable to the debug device, the debug port state machine and the processor interface state machine generating handshake signals to communicate with the input/output port, the processor core, and the trace logic.

24. A debug interface according to claim 23 wherein the input/output port is a serial input/output port.

25. A debug interface according to claim 23 wherein the input/output port is a parallel input/output port.

26. A debug interface according to claim 23 wherein the input/output port is a JTAG (Joint Test Action Group) standard port.

27. A debug interface according to claim 23, wherein the debug device is a host system.

28. An integrated computer chip comprising:

the processor core; and the debug interface according to claim 23.

29. A debug interface for interfacing a processor core to a debug device, the debug interface comprising:

a debug register;

an input/output port coupled to the debug register and executing at an input/output port clock rate;

a trace logic coupled to the debug register and executing at a trace logic clock rate;

a processor interface state machine coupled to the debug register and connectable to the processor core, the processor interface state machine executing at a processor clock rate; and a debug port state machine coupled to the debug register and the processor interface state machine, and connectable to the debug device; and a decoder coupled to the debug register, the decoder for decoding commands from the input/output port and the trace logic.

30. A debug interface according to claim 29 wherein the debug register is shared for data storage of data from the input/output port and from the trace logic.

31. A debug interface according to claim 29 wherein the input/output port is a serial input/output port.

32. A debug interface according to claim 29 wherein the input/output port is a parallel input/output port.

33. A debug interface according to claim 29 wherein the input/output port is a JTAG (Joint Test Action Group) standard port.

34. A debug interface according to claim 29, wherein the debug device is a host system.

35. A method of operating a processor during a trace operation that supplies trace records indicative of instruction execution flow in the processor, the method comprising:

providing a debug interface state machine;

selecting a trace entry point address that designates an instruction program counter value in an instruction memory of the processor;

executing instructions in the processor at program counter locations determined by a program flow;

comparing the program counter locations to the selected trace entry point address;

when the program counter location is the same as the trace entry point address, generating an interrupt through an operation of the debug interface state machine; and executing an interrupt service routine including a trace mode program code.

* * * * *